United States Patent
Yiu et al.

(10) Patent No.: US 11,006,304 B2
(45) Date of Patent: May 11, 2021

(54) BEAM MEASUREMENT IN A WIRELESS COMMUNICATION NETWORK FOR IDENTIFYING CANDIDATE BEAMS FOR A HANDOVER

(71) Applicant: INTEL IP CORPORATION, Santa Clara, CA (US)

(72) Inventors: Candy Yiu, Portland, OR (US); Sungho Moon, San Jose, CA (US); Yang Tang, Pleasanton, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/093,019

(22) PCT Filed: Apr. 13, 2017

(86) PCT No.: PCT/US2017/027470
§ 371 (c)(1),
(2) Date: Oct. 11, 2018

(87) PCT Pub. No.: WO2017/196491
PCT Pub. Date: Nov. 16, 2017

(65) Prior Publication Data
US 2019/0159054 A1 May 23, 2019

Related U.S. Application Data

(60) Provisional application No. 62/336,487, filed on May 13, 2016.

(51) Int. Cl.
*H04B 7/08* (2006.01)
*H04W 36/06* (2009.01)
(Continued)

(52) U.S. Cl.
CPC .......... *H04W 24/10* (2013.01); *H04B 7/0408* (2013.01); *H04B 7/063* (2013.01);
(Continued)

(58) Field of Classification Search
CPC .......................... H04W 24/10; H04W 36/0085
See application file for complete search history.

(56) References Cited

U.S. PATENT DOCUMENTS

| | | | |
|---|---|---|---|
| 2012/0052828 A1 | 3/2012 | Kamel et al. | |
| 2012/0076031 A1* | 3/2012 | Zeira | H04B 7/0408 370/252 |

(Continued)

FOREIGN PATENT DOCUMENTS

| | | |
|---|---|---|
| WO | 2015/080645 A1 | 6/2015 |
| WO | 2017034509 A1 | 3/2017 |
| WO | 2017171952 A1 | 10/2017 |

OTHER PUBLICATIONS

International Search Report and Written Opinion for International Patent Application No. PCT/US2017/027470 dated Jul. 7, 2017; 21 pages.

(Continued)

*Primary Examiner* — Angel T Brockman
(74) *Attorney, Agent, or Firm* — Schwabe, Williamson & Wyatt, P.C.

(57) ABSTRACT

Beam measurement reporting circuitry is provided for a user equipment (UE) of a wireless telecommunications network. The beam measurement reporting circuitry receives from the network, beam measurement configuration data and measures signal qualities for a plurality of received beams originating from a beam source of the network (serving and neighbouring cells). Beam measurements are performed by the UE to facilitate identification of a non-zero integer, N, beams depending upon the signal quality measurements. The identified beams can be candidate beams for a handover.

(Continued)

Circuitry for a NodeB is also provided. A UE, a NodeB and corresponding methods incorporating the beam measurement reporting circuitry and beam measurement configuration circuitry are also provided.

23 Claims, 7 Drawing Sheets

(51) Int. Cl.
| | |
|---|---|
| *H04W 36/00* | (2009.01) |
| *H04W 24/10* | (2009.01) |
| *H04W 36/08* | (2009.01) |
| *H04B 7/06* | (2006.01) |
| *H04B 7/0408* | (2017.01) |
| *H04B 17/318* | (2015.01) |
| *H04B 7/024* | (2017.01) |

(52) U.S. Cl.
CPC .......... *H04B 7/088* (2013.01); *H04B 17/318* (2015.01); *H04W 36/0069* (2018.08); *H04W 36/0083* (2013.01); *H04W 36/0085* (2018.08); *H04W 36/06* (2013.01); *H04W 36/08* (2013.01); *H04B 7/024* (2013.01)

(56) References Cited

U.S. PATENT DOCUMENTS

2013/0083774 A1   4/2013   Son et al.
2013/0121185 A1   5/2013   Li et al.
2018/0205585 A1*  7/2018   Sadiq .................. H04L 27/2613

OTHER PUBLICATIONS

3GPP TS 36.331 V13.1.0 (Mar. 2016); "Technical Specification Group Radio Access Network; Evolved Universal Terrestrial Radio Access (E-UTRA); Radio Resource Control (RRC); Protocol specification (Release 13)," 551 pages.

Mediatek Inc., "Cell Selection and Reselection in NR," 3GPP TSG-RAN WG2 Meeting #97bis, R2-1703013, Agenda Item: 10.4.2.2, Apr. 3-7, 2017, Spokane, WA, 4 pages.

Mediatek Inc., "Cell Quality Derivation and Measurement Events for NR Mobility," 3GPP TSG-RAN WG2 Meeting NR AH, R2-1700273, Agenda Item: 3.3.1.1.1, Jan. 17-19, 2017, Spokane, WA, 4 pages.

Huawei, Hisilicon, "Measurement configuration and reporting considering additional RS," 3GPP TSG-RAN WG2 Meeting #97bis, R2-1703387, Agenda Item: 10.4.1.3, Apr. 3-7, 2017, Spokane, Washington, 3 pages.

European Patent Office—Article 94(3) dated Jun. 15, 2020, from European Patent Application No. 17718792.9, 11 pages.

CMCC, "Beam Related Measurement Report and Inter-cell HO in NR," 3GPP TSG-RAN WG2 Meeting #97, R2-1701921 (Revision of R2-1700532), Agenda Item: 10.3.1.1.1, Feb. 13-17, 2017, Athens, Greece, 7 pages.

* cited by examiner

BEAM MEASUREMENT IN A WIRELESS COMMUNICATION NETWORK FOR IDENTIFYING CANDIDATE BEAMS FOR A HANDOVER

Cross Reference to Related Applications

The present application is a national phase entry under 35 U.S.C. § 371 of International Application No. PCT/US2017/027470, filed Apr. 13, 2017, entitled "BEAM MEASUREMENT IN A WIRELESS COMMUNICATION NETWORK", which claims priority to U.S. Provisional Patent Application No. 62/336,487, filed May 13, 2016, entitled "BEAM MEASUREMENT FOR CELL IN NR," the entire disclosures of which are hereby incorporated by reference in their entireties.

TECHNICAL FIELD

The present disclosure relates generally to a network node and a method therein for receiving a report from a wireless device, the wireless device and a method therein for sending the report to the network node, and computer programs and computer-readable storage mediums, having stored thereon the computer programs to carry out these methods.

BACKGROUND

Communication devices such as terminals are also known as e.g. User Equipments (UE), wireless devices, mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station.

The expression Uplink (UL) is used for the transmission path in the opposite direction i.e. from the mobile station to the base station.

In $3^{rd}$ Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

The development of the $5^{th}$ Generation (5G) access technology and air interface is still very premature but there have been some early publications on potential technology candidates. A candidate on a 5G air interface is to scale the current LTE, which is limited to 20 Mega Hertz (MHz) bandwidth, N times in bandwidth with 1/N times shorter time duration, here abbreviated as LTE-Nx. A typical value may be N=5 so that the carrier has 100 MHz bandwidth and 0.1 millisecond slot lengths. With this approach, many functions in LTE can remain the same, which would simplify the standardization effort and allow for a reuse of technology components.

The carrier frequency for an anticipated 5G system could be much higher than current 3G and $4^{th}$ Generation (4G) systems, values in the range 10-80 Giga Hertz (GHz) have been discussed. At these high frequencies, an array antenna, or antenna array, must be used to achieve coverage through beamforming gain. Since the wavelength is less than 3 centimeters (cm), an array antenna with a large number of antenna elements may be fit into an antenna enclosure with a size comparable to 3G and 4G base station antennas of today. To achieve a reasonable link budget, a typical example of a total array antenna size is comparable to an A4 sheet of paper.

To provide a sufficient link budget, the beams are typically highly directive and give beamforming gains of 20 decibels (dB) or more since so many antenna elements participate in forming a beam. This means that each beam is relatively narrow in angle, a Half Power Beam Width (HPBW) of 5 degrees is not uncommon. Hence, a sector of a cell may need to be covered with a large number of potential beams. Beamforming may be seen as when a signal is transmitted in such as narrow HPBW, that it is intended for a single wireless device or a group of wireless devices in a similar geographical position. This may be seen in contrast to other beam shaping techniques, such as cell shaping, where the coverage of a cell is dynamically adjusted to follow the geographical positions of a group of users in the cell. Although beamforming and cell shaping use similar techniques, transmitting a signal over multiple antenna elements and applying individual complex weights to these antenna elements, the notion of beamforming and beams in embodiments herein relates to the narrow HPBW basically intended for a single wireless device or terminal position.

Here, a system with multiple transmission nodes is considered, where each node has an array antenna capable of generating many beams with small HPBW. These nodes may then for instance use one or multiple LTE-Nx carriers, so that a total transmission bandwidth of multiples of hundreds of MHz may be achieved leading to downlink peak user throughputs reaching as much as 10 Gbit/s or more.

In LTE, a wireless device searches for a cell using a cell search procedure, where a unique Primary Synchronization Signal (PSS) and Secondary Synchronization Signal (SSS) are transmitted from each eNB. When a cell has been found, the wireless device may be associated with this cell, and then the cell is known as the serving cell for this wireless device. When a cell has multiple antennas, each antenna may transmit an individual encoded message to the wireless device, thereby multiplying the capacity by the number of layers transmitted. This is well known as MIMO transmissions, and the number of layers transmitted is known as the rank of the transmission. Beamforming, which traditionally is equivalent to a rank 1 transmission, where only one encoded message may be transmitted, but simultaneously from all antennas with individually set complex beamforming weights per antenna. Hence, in beamforming, only a single layer of a Physical Downlink Shared CHannel (PDSCH) is transmitted in a single beam. This beamforming transmission is also possible in LTE, so after a wireless device has been associated with a cell, a set of N=1, 2, 4 or 8 Channel State Information Reference Signals (CSI-RS) may be configured for measurement reference at the wireless device, so that the wireless device may report a preferred rank 1 N×1 precoding vector containing the complex beamforming weights based on the CSI-RS measurement. The precoding vector is selected from a codebook of rank 1 precoding vectors.

FIG. 1 depicts a 5G system example with three Transmission Points (TPs), Transmission Point 1 (TP1), Transmission Point 2 (TP2), Transmission Point 3 (TP3) and a wireless device. Each TP utilizes beamforming for transmission.

The current beamforming usage today does not result in a desired gain of the performance of the wireless communications network.

SUMMARY

It is an object of embodiments herein to improve the performance in a wireless communications network using beamforming for transmitting to a wireless device.

According to a first aspect of embodiments herein, the object is achieved by a method performed by a network node for receiving a report from a wireless device. The network node controls one or more Transmission Points, TPs. The one or more TPs transmit TP beams. The network node selects a set of TP beams from the TP beams. The selecting is based on at least one of: a) one or more measurements by the wireless device on first beam-specific reference signals of the TP beams, and b) a measured transmission from the wireless device by the one or more TPs. The first beam-specific reference signals of the TP beams are defined so that each beam in a TP out of the one or more TPs, uses one unique signal from a set of sequences used in this TP. The network node configures the wireless device with a set of second beam-specific reference signals. The set of second beam-specific reference signals are beam-specific downlink reference signals. Each second beam-specific reference signal is associated with a selected TP beam of the set of TP beams. The network node receives the report from the wireless device. The report comprises channel state information for at least a subset of the selected set of TP beams, measured on the configured set of second beam-specific reference signals.

According to a second aspect of embodiments herein, the object is achieved by a method performed by the wireless device for sending the report to the network node. The network node controls the one or more TPs. The one or more TPs transmit TP, beams. Each of the TP beams has a first beam-specific reference signal. The wireless device receives the configuration from the network node with the set of second beam-specific reference signals. The set of second beam-specific reference signals are the beam-specific downlink reference signals. Each second beam-specific reference signal is associated with one of the selected set of TP beams. The selected set of TP beams are selected by the network node based on the at least one of: a) the one or more measurements by the wireless device on the first beam-specific reference signals of the TP beams, and b) the a measured transmission from the wireless device 250 by the one or more TPs. The first beam-specific reference signals of the TP beams are defined so that each beam in a TP out of the one or more TPs, uses one unique signal from a set of sequences used in this TP. The configuration is for the wireless device to perform the one or more measurements on the set of second beam-specific reference signals. The wireless device sends the report to the network node. The report comprises channel state information for at least the subset of the set of selected TP beams, measured on the configured set of second beam-specific reference signals.

According to a third aspect of embodiments herein, the object is achieved by the network node. The network node is configured to receive the report from the wireless device. The network node is also configured to control the one or more TPs. The one or more TPs are configured to transmit the TP beams. The network node is configured to select the set of TP beams from the TP beams. To select is based on the at least one of: a) the one or more measurements by the wireless device on the first beam-specific reference signals of the TP beams, and b) the transmission from the wireless device configured to be measured by the one or more TPs. The first beam-specific reference signals of the TP beams are defined so that each beam in a TP out of the one or more TPs, uses one unique signal from a set of sequences used in this TP. The network node is configured to configure the wireless device with the set of second beam-specific reference signals. The set of second beam-specific reference signals are beam-specific downlink reference signals. Each second beam-specific reference signal is associated with a selected TP beam. The network node is configured to receive the report from the wireless device. The report comprises channel state information for at least a subset of the selected set of TP beams, measured on the configured set of second beam-specific reference signals.

According to a fourth aspect of embodiments herein, the object is achieved by the wireless device. The wireless device is configured to send the report to the network node. The network node is configured to control the one or more TPs. The one or more TPs are configured to transmit the TP beams. Each of the TP beams has a first beam-specific reference signal. The wireless device is configured to receive the configuration from the network node with the set of second beam-specific reference signals. The set of second beam-specific reference signals are beam-specific downlink reference signals. Each of the second beam-specific reference signals is associated with one of the selected set of TP beams. The selected set of TP beams are selected by the network node based on the at least one of: a) the one or more measurements by the wireless device on first beam-specific reference signals of the TP beams, and b) the transmission from the wireless device configured to be measured by the one or more TPs. The configuration is for the wireless device to perform one or more measurements on the set of second beam-specific reference signals. The first beam-specific reference signals of the TP beams are defined so that each beam in a TP out of the one or more TPs, uses one unique signal from the set of sequences used in this TP. The wireless device is further configured to send a report to the network node. The report comprises channel state information for at least the subset of the set of selected TP beams, configured to be measured on the configured set of second beam-specific reference signals.

According to a fifth aspect of embodiments herein, the object is achieved by a computer program, comprising instructions which, when executed on at least one processor, cause the at least one processor to carry out the method performed by the network node.

According to a sixth aspect of embodiments herein, the object is achieved by a computer-readable storage medium, having stored thereon the computer program, comprising instructions which, when executed on at least one processor, cause the at least one processor to carry out the method performed by the network node.

According to a seventh aspect of embodiments herein, the object is achieved by a computer program, comprising instructions which, when executed on at least one processor, cause the at least one processor to carry out the method performed by the wireless device.

According to an eighth aspect of embodiments herein, the object is achieved by a computer-readable storage medium, having stored thereon the computer program, comprising instructions which, when executed on at least one processor, cause the at least one processor to carry out the method performed by the wireless device.

By the network node selecting the set of TP beams, based on the one or more measurements by the wireless device, and configuring the wireless device with the set of second beam-specific reference signals, the wireless device may report channel state information for at least a subset of the selected set of TP beams. Thus, an advantage of embodiments herein is that the overhead for quality estimates may be reduced. Moreover, the wireless device may quickly switch to from one TP beam to another TP beam, which improves mobility and gives diversity for both data and control signalling.

Further advantages of some embodiments disclosed herein are discussed below.

BRIEF DESCRIPTION OF THE DRAWINGS

Examples of embodiments herein are described in more detail with reference to the accompanying drawings, in which:

FIG. 8 is a block diagram of a wireless device that is configured according to some embodiments.

DETAILED DESCRIPTION

Figure 1:
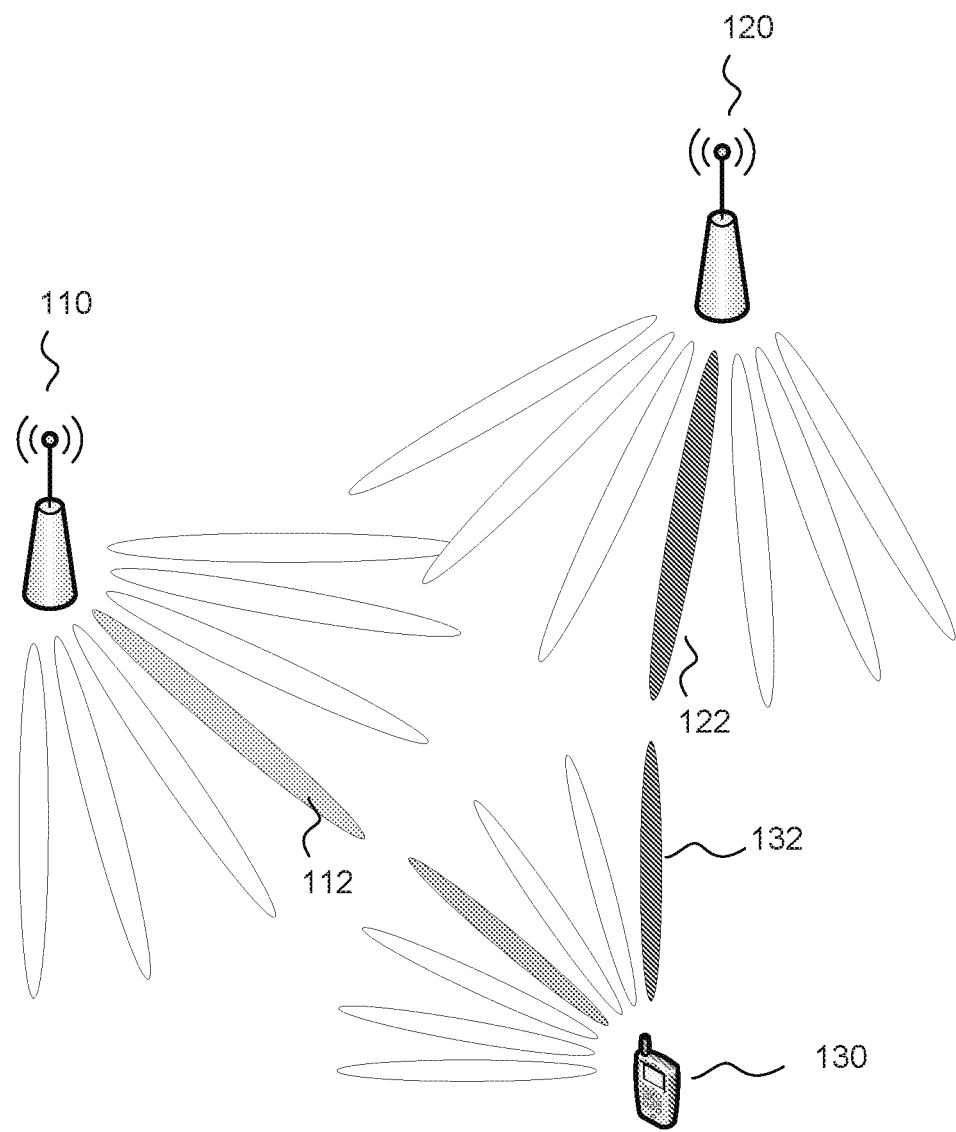
FIG. 1 is a schematic diagram illustrating a 5G system example with three TPs.

As part of the solution according to embodiments herein, one or more problems that may be associated with use of at least some of the prior art solutions, and that may be addressed by embodiments herein will first be identified and discussed.

Since the beams in beamforming are narrow, to provide high beamforming gain and coverage for the transmitted signals, there is a mobility problem and the transmission point may quickly lose track of the wireless device, i.e., there is a sudden large drop of link gain when the wireless device is moving outside the narrow beam coverage area.

It may also be a problem how to select transmission points and beams within each transmission point in a dynamic manner, without the need to frequently change the serving transmission point.

It may be further a problem how to provide coverage and robust reception of synchronization signals and reference signals needed to ensure mobility in the 5G network.

These problems are further discussed below.

At high (>10 GHz) carrier frequencies such as those projected to be used in 5G systems, the number of antenna elements at the transmitter and/or receiver side are significantly increased compared to common 3G and 4G systems, which typically operate at frequencies below 3 GHz, so that the increased path loss may be compensated for by beamforming. If these beams are narrow, many beams are needed to span the coverage area. It may then be a problem how to find cells, i.e., to perform cell search, and how to find the suitable beam or beams within a detected cell. It may also be a problem how to find multiple cells and the corresponding suitable beams within each cell.

A set of TPs may be considered wherein each TP may, by use of an array antenna, generate transmission of a large number of beams having different pointing direction and/or polarization. The use of a large number of beams may be typical for a 5G system deployed at carrier frequencies above 10 GHz, where the array antenna may consist of many antenna elements to achieve a large array gain. An array antenna consisting of multiple antenna elements may be used to compensate for the reduced aperture size of each element, which is a function of the carrier frequency, compared to systems operating at traditional cellular carrier frequencies. Moreover, the large antenna gain may be in turn needed to overcome the path loss at these high frequencies. The large array gain may result in that each beam is rather narrow, expressed in terms of HPBW, typically only 5-10 degrees or even smaller, depending on the design of the array antenna.

Since the large array gain may be needed also for unicast control channels, these may need to be beamformed as well. Due to wireless device mobility, channel propagation, and to the fact that beams are narrow, a wireless device which is reached by a given beam may suddenly be outside the main lobe of that beam, resulting in a significant drop in received signal strength from that beam. This may even lead to radio link failure since the control channel cannot be received as well.

Hence, there is a problem on how a wireless device selects cells, TPs within a cell, and beams within a cell, to maintain connection in a robust manner. Note that a cell in this respect may contain multiple TPs, known as a shared cell. The shared cell reduces the need for frequent cell handovers which involves higher layer signaling and reconfigurations since a wireless device may seamlessly move its access to different TPs within the same cell.

Furthermore, it may be beneficial if the TP and beam selection is blind, and it may hence be performed without an active connection to the cell, that is, without extensive control signaling between the wireless device and the cell for which beam the wireless device finds useful.

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

Figure 2:
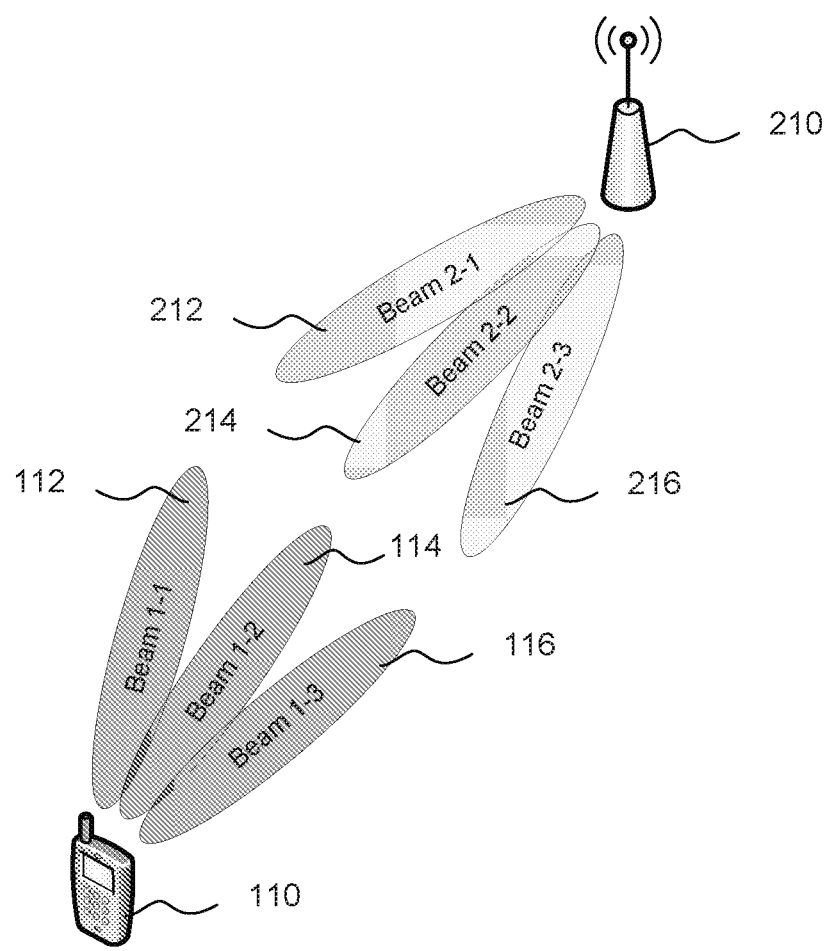
FIG. 2 is a schematic block diagram illustrating embodiments in a wireless communications network, according to some embodiments.

FIG. 2 depicts a wireless communications network 200 in which embodiments herein may be implemented. The wireless communications network 200 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WMax), 5G system or any cellular network or system.

The wireless communications network 200 comprises a first transmission point 211, a second transmission point 212 and a third transmission point 213. Any one or more of the first transmission point 211, the second transmission point 212 and the third transmission point 213 may be referred to herein as the one or more TPs 211, 212, 213. Each of the first transmission point 211, the second transmission point 212 and the third transmission point 213 transmits TP beams. Each of the first transmission point 211, the second transmission point 212 and the third transmission point 213 may be, for example, a base station such as e.g., an eNB, an eNodeB, or a Home Node B, a Home eNode B, a femto Base Station, BS, a pico BS or any other network unit capable to serve a device or a machine type communication device in the wireless communications network 200. In some particular embodiments, the first transmission point 211, the second transmission point 212 and the third transmission point 213 may be a stationary or fixed relay node or a mobile relay node. The wireless communications network 200 covers a geographical area which is divided into cell areas, wherein each cell area is served by a TP, although one TP may serve one or several cells, and one cell may be served by more than one TP. In the non-limiting example depicted in FIG. 2, the first transmission point 211 and the third transmission point 213 serve a first cell 221, and the second transmission point 212 serves a second cell 222. The first cell 221, may be referred to in some embodiments herein as "a cell 221", "one cell 221" or "the cell 221". The first cell 221 and the second cell 222 may be referred to in some embodiments herein as "different cells 221, 222". Each of the first transmission point 211, the second transmission point 212 and the third transmission point 213 may be of different classes, such as e.g. macro eNodeB, home eNodeB or pico base station, based on transmission power and thereby also cell size.

Typically, the wireless communications network 200 may comprise more cells similar to the first cell 221 and the second cell 222, served by their respective one or more TPs. This is not depicted in FIG. 2 for the sake of simplicity. Each of the first transmission point 211, the second transmission point 212 and the third transmission point 213 may support one or several communication technologies, and its name may depend on the technology and terminology used. In 3GPP LTE, the first transmission point 211, the second transmission point 212 and the third transmission point 213, which may be referred to as eNodeBs or even eNBs, and may be directly connected to a scheduling network node 230. The scheduling network node 230 may be a logical function performing scheduling of wireless devices in the wireless communications network 200 that are within the coverage of a group of coordinated TPs. The physical location of the scheduling network node 230 may be in one of the first transmission point 211, the second transmission point 212 and the third transmission point 213, or in a dedicated scheduling node, as depicted in FIG. 2. In some embodiments, any one or more of the first transmission point 211, the second transmission point 212 and the third transmission point 213 may be realized as a Remote Radio Head (RRH) connected to a central node housing the scheduling function, i.e., the scheduling network node 230.

The first transmission point 211 may communicate with the scheduling network node 230 over a first link 241. The second transmission point 212 may communicate with the scheduling network node 230 over a second link 242. The third transmission point 213 may communicate with the scheduling network node 230 over a third link 243.

Any of the first transmission point 211 and the scheduling network node 230 may be referred to herein as a network node 211, 230. The network node 211, 230 controls one or more TPs, such as any of the first transmission point 211, the second transmission point 212 and the third transmission point 213.

The first transmission point 211 may communicate with the second transmission point 212 over a first radio link 244. The first transmission point 211 may communicate with the third transmission point 213 over a second radio link 245.

A number of wireless devices may be located in the wireless communications network 200. In the example scenario of FIG. 2, only one wireless device is shown, wireless device 250. The wireless device 250 may communicate with the first transmission point 211 over a third radio link 261, with the second transmission point 212 over a fourth radio link 262, and with the third transmission point 213 over a fifth radio link 263.

The wireless device 250 is a wireless communication device such as a UE which is also known as e.g. mobile terminal, wireless terminal and/or mobile station. The device is wireless, i.e., it is enabled to communicate wirelessly in the wireless communication network 200, sometimes also referred to as a cellular radio system or cellular network. The communication may be performed e.g., between two devices, between a device and a regular telephone and/or between a device and a server. The communication may be performed e.g., via a RAN and possibly one or more core networks, comprised within the wireless communications network 200.

The wireless device 250 may further be referred to as a mobile telephone, cellular telephone, or laptop with wireless capability, just to mention some further examples. The wireless device 250 in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, a Machine-to-Machine (M2M) device, a device equipped with a wireless interface, such as a printer or a file storage device or any other radio network unit capable of communicating over a radio link in a cellular communications system. Further examples of different wireless devices, such as the wireless device 250, that may be served by such a system include, modems, or Machine Type Communication (MTC) devices such as sensors.

In embodiments herein, it is first proposed to introduce one or more TP beam-specific reference signals. These one or more TP beam-specific reference signals may be referred to in some embodiments herein as a first beam-specific reference signal/s of the TP beams, so that the wireless device 250, may detect and/or measure on a beam from any TP, such as the first transmission point 211, the second transmission point 212 and the third transmission point 213, in any cell, such as the first cell 221, and the second cell 222, in a neighborhood of the wireless device 250. The TP beam-specific reference signal, such as the first beam-specific reference signals of the TP beams, from a TP, may be detectable blindly, i.e., without the need to actively communicate with the cell, i.e., without receiving configuration information of the TP beam-specific reference signals, from for example, the network node 211, 230. The signal may hence either be blindly detected as part of the initial cell search, or alternatively, the detection may be aided by previously obtained information, such as broadcasted system information on the 5G carrier or control messages sent on an assisting legacy cellular system, such as LTE.

Furthermore, these reference signals, i.e., first beam-specific reference signals of the TP beams, may alternatively also be detected based on time domain detection, so that the wireless device 250 may not need to perform accurate time frequency synchronization and carry out the Discrete Fourier Transform (DFT), i.e. transfer to frequency domain, before the wireless device 250 may detect the TP-beam. The wireless device 250 may choose to implement time domain based beam detection, with the benefit of reduced number of mathematical operations, which may reduce battery consumption. This also has the advantage that the LTE cell search algorithms in the wireless device 250 may be reused for TP beam detection. The wireless device 250 may then be implemented to perform time domain search of beams by correlation of the received signal with a set of TP beam specific signals. This time domain processing may be performed in parallel with normal receiver operation, which includes a DFT and is performed in frequency domain. Hence, the TP beam search may be implemented by a separate processing, which allows the wireless device 250 to perform continuous TP beam searches without interrupting normal receiver operation. Based on the detection of the first beam-specific reference signals, the wireless device 250 may determine how to address the network node 211, 230 in the best way by selecting the best set of UL transmit antenna/s or beams to use when transmitting an UL message intended for the network node 211, 230. Such an UL message may be anything transmitted in the UL, e.g., a random access preamble, a scheduling request or an UL data transmission.

In general, embodiments herein may comprise a reporting procedure comprising two steps. Some embodiments may comprise a first step of a reporting procedure.

In a first step of these embodiments, the wireless device 250 may search for TP beams, using a procedure similar to LTE cell search. The wireless device 250 may then report detected TP beams, possibly accompanied with a received power report or other ranking of each detected TP beam or a selection of the detected TP beams. Selection may be carried out using a threshold value, e.g., configured by higher layers or fixed in specifications, or it may simply report all detected TP beams up to a specific maximum number of reports or a specific maximum number of beams.

In one embodiment, a large number of TP beam reference signals or equivalently beam-specific sequences, such as the first beam-specific reference signals of the TP beams, are defined so that each beam in a TP, such as the first transmission point 211 and the third transmission point 213 in a given cell, such as the first cell 221, uses one unique signal from a set of sequences used in this cell. The reference signals, such as the first beam-specific reference signals of the TP beams, are grouped, and the grouping of sequences may be known to the wireless device 250 so the wireless device 250 may know whether two detected beams belong to the same TP or not, or alternatively to the same cluster of TPs or not. In a further embodiment, this may be utilized by the network node 211, 230, by configuring, using higher layer signaling, the wireless device 250 to restrict the reporting of detected beams to measurements on TP beams from a single TP only, of, for example, the first transmission point 211, the second transmission point 212 and the third transmission point 213, or alternatively, only TPs within the same cluster of TPs. Which TP, of, for example, the first transmission point 211, the second transmission point 212 and the third transmission point 213, or cluster may also be configured by higher layers. One advantage of such restriction may be the case where a backhaul between different TPs, or clusters of TPs have a restriction in latency and/or bandwidth, so that fast switching between different TPs is not feasible, while switching between beams within the same TP is still feasible. The network node 211, 230 may perform the configuration by signalling messages on an assisting legacy cellular system. In yet another embodiment, system information already obtained by the wireless device 250 on the 5G carrier dictates if the wireless device 250 should report measurements on a single or a multiple of reference signal groups.

In an alternative embodiment, a large number of reference signals, such as the first beam-specific reference signals of the TP beams, or equivalently beam-specific sequences are defined, so that each beam in a TP in a given cell, uses one unique signal from a set of sequences used in this cell. The reference signals, are grouped into groups where reference signals within one group are used within one cell only, and the grouping of sequences may be known to the wireless device 250 so the wireless device 250 may know whether two detected TP beams belong to the same cell or not. When the wireless device 250 is not connected to a cell, e.g. in Radio Resource Configuration (RRC)_IDLE mode, the wireless device 250 may identify the cell identity by detecting a TP beam belonging to that cell. This cell identity may then be used in the following procedures to attach to the cell.

The reported TP beams associated to multiple cells, may also be used by the network node 211, 230 to make mobility decisions, i.e., to move a wireless device such as wireless device 250 between cells, by sending a hand-over command.

In another embodiment, the PSS/SSS used in LTE, or scaled versions thereof in case of LTE-Nx, may be re-used as TP beam sequences, such as the first beam-specific reference signals of the TP beams. These 504 sequences may be further grouped into sets of, e.g., 64 sequences, and this set of sequences may then be restricted to be used within one TP, only, limiting the number of possible beams per TP to 64. Alternatively, the length of PSS/SSS may be extended, to be longer, i.e., use more Resource Elements (RE), than in the current LTE system, so that more than 504 sequences may be supported, for instance by using longer Zadoff-Chu sequences. Using longer sequences and transmitting the TP beam sequences, over a wider bandwidth may increase the processing gain and thus enable detection of weaker beams as well.

If a large number, e.g., all 64 in the example above, of PSS/SSS sequences, or equivalently TP-beam detection signals, such as the first beam-specific reference signals of the TP beams, are transmitted in the same Orthogonal Frequency Division Multiplexing (OFDM) symbol from a TP, the energy per PSS/SSS may need to be scaled to keep the total transmit power within bounds. Hence, the transmitted power per sequence may be reduced by $-10*\log10(64)$ dB, leading to a degradation in beam detection probability. Therefore, in an alternative embodiment, the number of PSS/SSS sequences to be transmitted in parallel in the same OFDM symbol, e.g., by code division multiplexing, may be limited, and if more beams are needed, additional PSS/SSS for the remaining beams may be time multiplexed or frequency multiplexed, for instance, transmitted in another OFDM symbol or on different frequency resources. In this way may the energy per beam detection reference signal may be kept sufficiently high.

Some embodiments may comprise a second step of the reporting procedure.

In this second step of some of these embodiments herein, the network node 211, 230 may select a set of TP beams that the wireless device 250 may use for a more refined, second step feedback. This selected set of TP beams may belong to the same TP or a different TP within a cell, or even different TP-beams in different cells. In the latter case, coordinated transmission between cells, may be achieved, which may provide benefits if the backhaul signaling has low delay and sufficient capacity.

The TP beam selection may be based on the reported TP beams in the first step described above. Alternatively, TP beams may be configured based on uplink measurement information at the transmission point. This alternative may be feasible whenever the uplink and downlink hardware chains are well calibrated so that a downlink beam may be inferred from a corresponding reception in an uplink beam. It may also be possible that the network node 211, 230 uses a combination of information from uplink beam detection and reports from the wireless device 250 when deciding the set of TP beams to configure the wireless device 250. Uplink beam detection may require signals to be transmitted from the wireless device 250 so that the network node 211, 230 may perform the associated beam detection measurements. Either the network node 211, 230 does this blindly based on uplink data traffic from the wireless device 250; or alternatively, the network node 211, 230 may configure, for example, Sounding Reference Signals (SRS) to the wireless device 250, so that the network node 211, 230 may measure on these signals. The SRS transmitted from the wireless device 250 may also be transmitted in uplink beams, in which case beam specific SRS is transmitted, beam-specific SRS. In this case, each beam may have a unique beam SRS, based on a certain reference signal sequence, wherein these signals are uplink signals, such as beam-specific uplink reference signals, or other attributes such as the time frequency location of the beam-specific SRS. The network node 211, 230 may then get simultaneous information on which pair of one transmit beam from the wireless device 250 and one receive beam at the network node 211, 230 side has good channel quality, e.g., high Signal to Noise Ratio (SNR). This may be accomplished by the network node 211, 230 by correlating, for each receive beam, with the different SRS-beam signals. Knowing which uplink beam to use is also beneficial when scheduling the uplink data transmission from the wireless device 250, which scheduling information then would include a beam identity detected from beam-specific SRS. The uplink measurements for beam selection may also be done on the random access preamble transmitted by the wireless device 250 when accessing the wireless communications network 200, or during hand-over.

The network node 211, 230 may then configure the wireless device 250 with a set of second beam-specific reference signals, for example, a set of D Channel State Information Reference Signals (CSI-RS), each corresponding to a selected TP beam. Note that these second beam-specific reference signals, e.g., CSI-RS, may be beamformed so that which beam actually may be selected, i.e., the beam ID if it exists, may be transparent to the wireless device 250. Hence, these D CSI-RS, may be beam-specific reference signals. This may give the further freedom to the network node 211, 230 to use a different beam or beamforming weight vector than what was used in the first step of the reporting procedure of embodiments herein, since the actual beamforming weight vector may be transparent to the wireless device 250.

When the second beam-specific reference signal, e.g., the beam specific CSI-RS, is configured to the wireless device 250, the wireless device 250 then may report channel state information for the set of the e.g., D TP beams, where each beam may be considered as a virtual antenna. This reporting may be different from the reporting in the first step, since the TP beams may be fixed and that the reporting may be intended to follow fast fading and polarization state of the channel. Hence, a unique and orthogonal reference signal may be transmitted in each TP-beam for the purpose of channel state information feedback. This reporting may be different from the reporting in the first step, since the CSI-RS may typically be more often transmitted and typically be with a larger bandwidth, as to provide a more refined measurement.

In one embodiment, the wireless device 250 may be configured to measure a number D of orthogonal reference signals that correspond to the set of second beam-specific reference signals, e.g., CSI-RS, i.e. location and sequence used for the Reference Signals (RSs). Each of the second beam-specific reference signals, e.g., D CSI-RS, may be transmitted from one TP beam in each transmission interval, e.g., each CSI-RS transmission interval. The actual TP beam that may be used in a transmission is unknown to the wireless device 250, which may measure on the configured signal only. The wireless device 250 may produce a measurement report based on the measurements, e.g., D measurements or a subset of the D measurements, i.e. TP beam selection, that is fed back to the network node 211, 230, who may know which transmission interval the report may be based on. In the next transmission interval, the set of TP beams may have changed. The number D and the set of second beam-specific reference signals, e.g., the set of CSI-RS, may remain the same, unless the wireless device 250 is reconfigured. A precoding vector/matrix codebook defined over D virtual antennas may be used for the purpose of this feedback signaling.

In another embodiment, the wireless device 250 may be dynamically scheduled to measure and report on a subset of a larger set of TP beams. The larger set may be the TP beams reported in the first step or explicitly configured with higher layer signaling. The dynamic signaling may be included in the scheduling message to the wireless device 250, for instance when triggering an aperiodic CSI report. For example, the aperiodic CSI triggering as defined in LTE, may be extended to also include information about which TP-beams the wireless device 250 shall provide a report for.

As in the previous embodiment, the wireless device 250 may produce a report that is fed back to the network node 211, 230. In next scheduling assignment or triggering event, another subset may be selected.

In view of the foregoing, embodiments herein may comprise the following:

1. A TP and a given beam transmitted from that TP (TP-beam) may be identified by the wireless device 250, e.g., by a TP beam specific reference signal, such as the first beam-specific reference signal of the TP beams.

2. The TP beam signals may be identifiable without configuration messages to the wireless device 250, i.e., they may be blindly detected.

3. The TP beam signals may also be designed so that the TP beam may be detected based on the received time domain signal.

4. The wireless device 250 may report to the network node 211, 230 a list of measures, one measure for each detected TP beam, where such measure may for instance be the received power.

5. The network node 211, 230 may configure, or dynamically schedule, a set of K TP beams, or CSI reference signals, such as the second beam-specific reference signals, the wireless device 250 may measure on to report, for example, Channel State Information (CSI).

Figure 3:
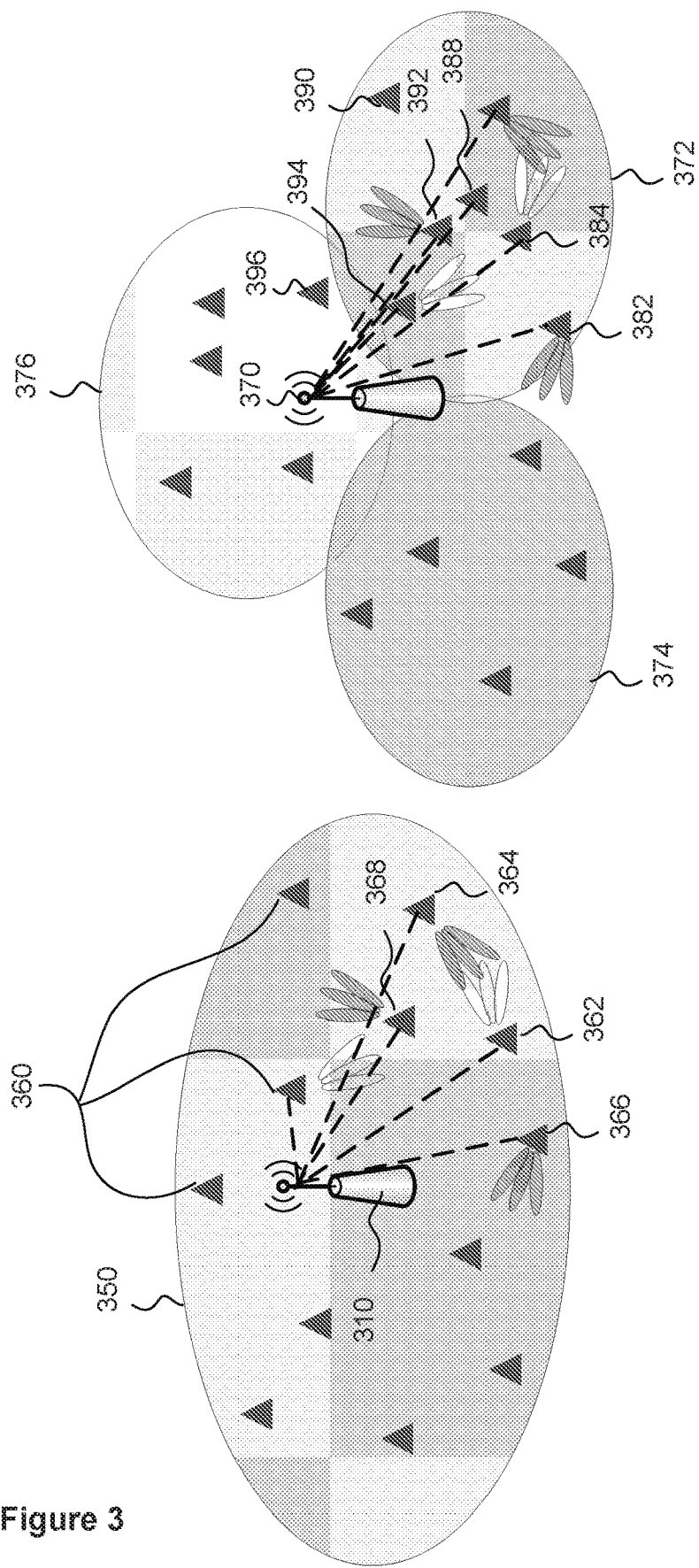
FIG. 3 is a flowchart illustrating embodiments of a method in a network node, according to some embodiments.

Embodiments of a method performed by the network node 211, 230 for receiving a report from the wireless device 250, will now be described with reference to the flowchart depicted depicted in FIG. 3. As stated earlier, the network node 211, 230 controls the one or more TPs 211, 212, 213 and the one or more TPs 211, 212, 213 transmit TP beams. The network node 211, 230 and the wireless device 250 operate in the wireless communications network 200, as stated earlier. FIG. 3 depicts a flowchart of the actions that are or may be performed by the network node 211, 230 in embodiments herein.

As stated earlier, the network node 211, 230 may be one of: the TP 211 and the scheduling network node 230. Some of the actions below involve receiving, sending or measuring actions. It is understood that in some embodiments wherein the network node 230 may be, for example, a scheduling network node 230 without radio receiver or transmitter capability, the sending, receiving or measuring actions may comprise sending or receiving through an intermediary node, such as one of the one or more TPs 211, 212, 213.

The method may comprise the following actions, which actions may as well be carried out in another suitable order than that described below. In some embodiments, all the actions may be carried out, whereas in other embodiments only some action/s may be carried out. In FIG. 3, optional actions are represented with dashed lines.

In some embodiments, any of the first beam-specific reference signals and the second beam-specific reference signals are one of: channel state information reference signals, positioning reference signals, Primary Synchronization Signals and Secondary Synchronization Signals.

Action 301

The network node 211, 230 may receive a prereport from the wireless device 250 of a preset of detected TP beams by the wireless device 250. The preset or pre-set is understood to be equivalent to a first set. Preset is used herein to distinguish this first set from a "set", i.e., a second set, of TP beams, which are selected by the network node 211, 230, as will be described later in Action 304.

The prereport may comprise information on the set of detected TP beams by the wireless device 250. The prereport is understood to be equivalent to a first report. In some embodiments, this action may be implemented by receiving a measurement report message from the wireless device 250. In some embodiments, the measurement report may comprise a list of detected TP beams, and to each, for example, an associated Received Reference Signal Power (RSRP).

In some embodiments, the preset of detected TP beams comprised in the received prereport has been selected by the wireless device 250 based on the first beam-specific reference signals of the TP beams, wherein the first beam-specific reference signals are downlink beam-specific reference signals.

In some embodiments, the first beam-specific reference signals are detectable by the wireless device 250 without being in connected mode to the one or more TPs 211, 212, 213 transmitting the TP beams comprising the first beam-specific reference signals.

In some embodiments, the first beam-specific reference signals are grouped, wherein the first beam-specific reference signals within one group are used within one cell 221 only.

Action 302

As explained earlier, in some embodiments, the wireless device 250 may perform a transmission, which transmission may comprise one or more uplink reference signals.

In some embodiments, the transmission from the wireless device 250 is done in uplink beams.

In some of these embodiments, the uplink reference signals are beam-specific uplink reference signals.

In this action, the network node 211, 230 may configure the wireless device 250 with the beam-specific uplink reference signals, so that the network node 211, 230 can measure on these beam-specific uplink reference signals. In some embodiments, this action may be implemented by sending a Radio Resource Configuration (RRC) message, to the wireless device 250.

In some embodiments, the uplink reference signals are beam-specific sounding reference signals.

In some particular embodiments, the beam-specific uplink reference signals are beam-specific sounding reference signals.

Action 303

The network node 211, 230 may measure the transmission from the wireless device 250.

As stated earlier, in some of these embodiments, the network node 211, 230 may measure the transmission by the wireless device 250 of the uplink reference signals.

In some of these embodiments, the network node 211, 230 may measure the transmission by the wireless device 250 of the beam-specific uplink reference signals.

In some embodiments, the measuring is done blindly on received signals, without configuring the beam-specific uplink reference signals, for example, uplink sounding reference signals.

Action 304

The network node 211, 230 selects a set of TP beams from the TP beams. The selecting is based on at least one of: a)

one or more measurements by the wireless device 250 on the first beam-specific reference signals of the TP beams, and b) a measured transmission from the wireless device 250 by the one or more TPs 211, 212, 213. As stated earlier, the first beam-specific reference signals of the TP beams are defined so that each beam in a TP 211, 212, 213 out of the one or more TPs 211, 212, 213, uses one unique signal from a set of sequences used in this TP 211, 212, 213.

The selecting is performed for the wireless device 250 to perform one or more measurements on the set of second beam-specific reference signals.

In some embodiments, the selecting of the set of TP beams by the network node 211, 230, based on the first beam-specific reference signals of the TP beams, comprises selecting the set of TP beams at least based on the received prereport from the wireless device 250, as described in action 301.

In some embodiments, the selecting of the set of TP beams by the network node 211, 230, based on the measured transmission from the wireless device 250 is based on one or more measurements on the uplink reference signals, as discussed earlier and in action 303.

In some embodiments, wherein the uplink reference signals are beam-specific uplink reference signals, as described in action 303.

In some embodiments, the selected set of TP beams from the TP beams belong to one of: the same TP 211, 212, 213, different TPs 211, 213 within the cell 221, and different TP beams in different cells 221, 222.

Action 305

The network node 211, 230 configures the wireless device 250 with the set of second beam-specific reference signals, wherein the set of second beam-specific reference signals are beam-specific downlink reference signals, and wherein each second beam-specific reference signal is associated with a selected TP beam of the set of TP beams.

In some embodiments, this action may be implemented by sending an RRC message, to the wireless device 250.

In some embodiments, the second beam-specific reference signals are mutually orthogonal.

In some embodiments, the network node 211, 230 configures the wireless device 250 to only report detected TP beams within a certain group. In some embodiments, this action may be implemented by sending an RRC message, or a broadcasted control signalling message, to the wireless device 250.

Action 306

The network node 211, 230 may trigger the report from the wireless device 250 by for example, sending a message to the wireless device 250, such as a Downlink Control Information message.

Action 307

The network node 211, 230 receives the report from the wireless device 250, the report comprising channel state information for at least a subset of the selected set of TP beams, measured on the configured set of second beam-specific reference signals. The report is understood to be equivalent to a second report from the wireless device 250.

In some embodiments, the report comprises at least one index to a precoding codebook.

In some embodiments, this action may be implemented by receiving an Uplink Control Information (UCI) message, from the wireless device 250.

Action 308

The network node 211, 230 may select one uplink beam from the uplink beams transmitted by the wireless device 250 for scheduling of uplink transmission, based on, for example, the received report. For example, the network node 211, 230, may select the uplink beam with the highest or best received channel quality, according to a determined criterion (e.g., based on a specific threshold).

In some embodiments, the selecting of the uplink beam is based on a correlation of each of the uplink beams transmitted by the wireless device 250 with each beam-specific uplink signal.

Action 309

The network node 211, 230 may schedule the wireless device 250, based on the received report. In some particular embodiments, the network node 211, 230 may schedule the wireless device 250, based on the selected uplink beam from the uplink beams transmitted by the wireless device 250 in action 308. For example, the network node 211, 230, may schedule the wireless device 250 in the uplink beam with the highest or best received channel quality, according to the determined criterion (e.g., based on the specific threshold).

In some embodiments, this action may be implemented by sending a scheduling message, such as a DCI message, to the wireless device 250.

Figure 4:
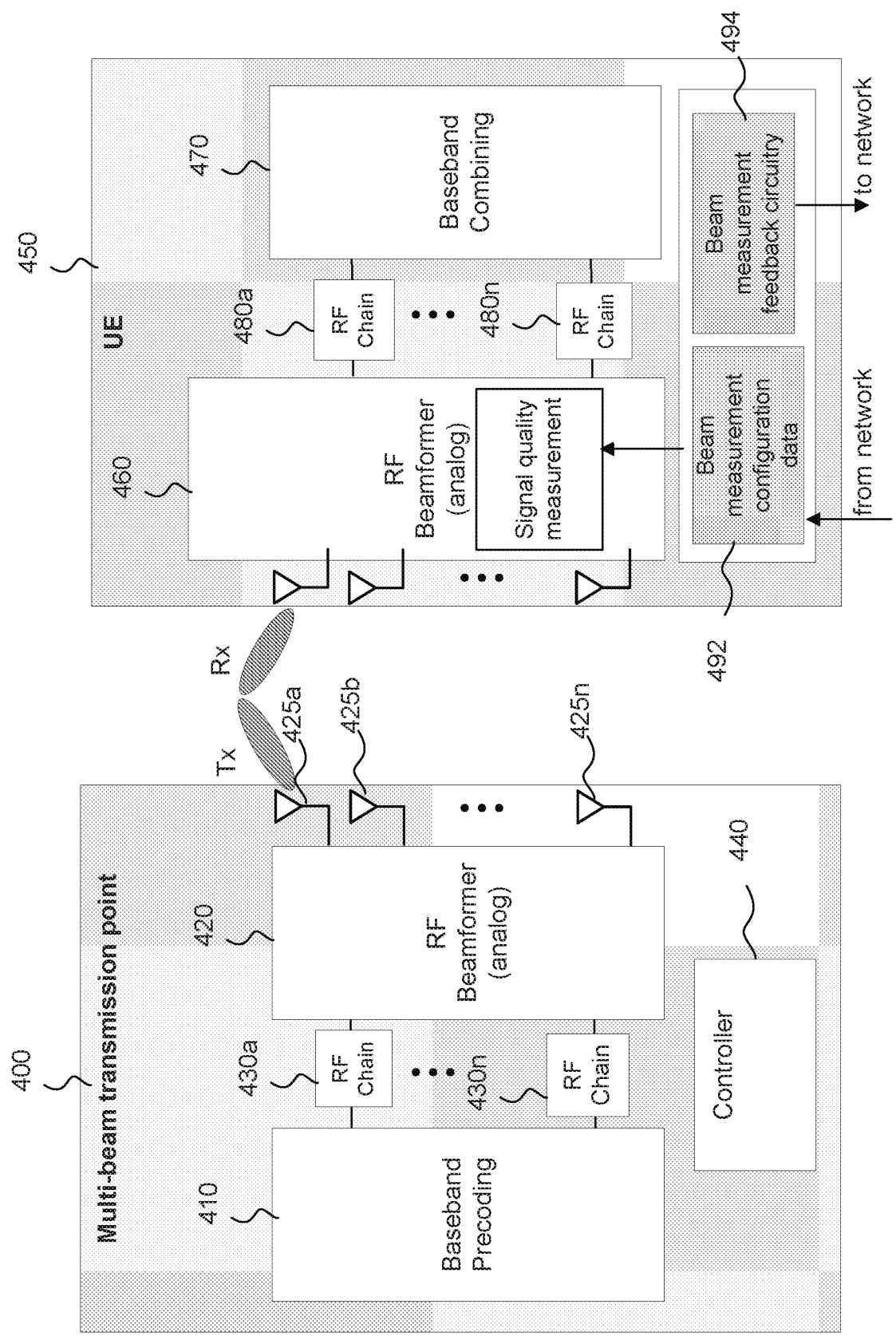
FIG. 4 is a flowchart illustrating embodiments of a method in a wireless device, according to some embodiments.

Embodiments of a method performed by the wireless device 250 for sending the report to the network node 211, 230, will now be described with reference to the flowchart depicted depicted in FIG. 4. As stated earlier, the network node 211, 230 controls one or more TPs 211, 212, 213 and the one or more TPs 211, 212, 213 transmit TP beams, wherein each of TP beams has the first beam-specific reference signal. The network node 211, 230 and the wireless device 250 operate in the wireless communications network 200, as stated earlier. FIG. 4 depicts a flowchart of the actions that are or may be performed by the wireless device 250 in embodiments herein.

As stated earlier, the network node 211, 230 may be one of: the TP 211 and the scheduling network node 230.

In some embodiments, the first beam-specific reference signals and the second beam-specific reference signals, as described earlier, are one of: channel state information reference signals, positioning reference signals, Primary Synchronization Signals and Secondary Synchronization Signals.

The method may comprise the following actions, which actions may as well be carried out in another suitable order than that described below. In some embodiments, all the actions may be carried out, whereas in other embodiments only some action/s may be carried out. In FIG. 4, optional actions are represented with dashed lines.

Some of the detailed description of elements of the following actions and nodes correspond to those described earlier in relation to FIG. 3, and will therefore not be repeated here.

Action 401

The wireless device 250 may search for TP beams. In some embodiments, the wireless device 250 searches for TB-beams, using a procedure similar to LTE cell search.

Action 402

The wireless device 250 may detect the TP beams. In some embodiments, this may be implemented by detecting the first beam-specific reference signals in the TP beams.

In some embodiments, the first beam-specific reference signals are detectable by the wireless device 250 without being in connected mode to the one or more TPs 211, 212, 213 transmitting the TP beams comprising the first beam-specific reference signals.

In some embodiments, the first beam-specific reference signals are grouped, and the first beam-specific reference signals within one group are used within one cell only 221.

In some embodiments, the Primary Synchronization Signals, positioning reference signals or the Secondary Synchronization Signals are grouped into sets of a defined number of sequences, and each of these sets of a defined number of sequences is restricted to be used within one TP 211, 212, 213 only.

Action 403

The wireless device 250 may identify a cell, such as the first cell 221, by detecting a TP beam belonging to that cell 221.

Action 404

The wireless device 250 may select a preset of detected TP beams, as described above.

In some embodiments, the preset of detected TP beams has been selected by the wireless device 250 based on the first beam-specific reference signals of the TP beams, wherein the first beam-specific reference signals are downlink beam-specific reference signals.

In some embodiments, selection of the present may be carried out using a threshold value, configured by higher layers or fixed in specifications, or the wireless device 250 may simply report all detected TP beams up to a specific maximum number of reports or a maximum number of beams.

Action 405

The wireless device 250 may send the prereport of the selected preset of detected TP beams to the network node 211, 230. In some embodiments, this action may be implemented by sending an RRC message, to the network node 211, 230.

The set of selected TP beams may then be selected by the network node 211, 230 at least based on the sent prereport.

In some embodiments, the preset of detected TP beams may possibly be accompanied with a received power report or other ranking of each detected TP beam.

Action 406

The wireless device 250 may receive the configuration from the network node 211, 230 with the beam-specific reference signals which are beam-specific uplink reference signals, so that the network node 211, 230 can measure on these beam-specific uplink reference signals. In some embodiments, this action may be implemented by receiving an RRC message, from the network node 211, 230.

In some embodiments, the beam-specific uplink reference signals are beam-specific sounding reference signals.

Action 407

As explained earlier, in some embodiments, the wireless device 250 may perform a transmission, which transmission may comprise the one or more uplink reference signals.

In some embodiments, the transmission from the wireless device 250 is done in uplink beams. In some of these embodiments, the uplink reference signals are beam-specific uplink reference signals. In some embodiments, the uplink reference signals are beam-specific sounding reference signals.

In this action, the wireless device 250 may transmit the beam-specific uplink reference signals.

In some embodiments, the set of selected TP beams are selected by the network node 211, 230 at least based on the measured transmission from the wireless device 250, as described earlier. In some embodiments, this is based on the one or more measurements on the uplink reference signals Action 408

The wireless device 250 receives the configuration from the network node 211, 230 with the set of second beam-specific reference signals. In some embodiments, this action may be implemented by receiving an RRC message, from the network node 211, 230.

The set of second beam-specific reference signals are beam-specific downlink reference signals, wherein each second beam-specific reference signal is associated with one of the selected set of TP beams. The set of TP beams are selected by the network node 211, 230 based on at least one of: a) the one or more measurements by the wireless device 250 on the first beam-specific reference signals of the TP beams, and b) the measured transmission from the wireless device 250 by the one or more TPs 211, 212, 213. The configuration is for the wireless device 250 to perform one or more measurements on the set of second beam-specific reference signals.

As stated earlier, the first beam-specific reference signals of the TP beams are defined so that each beam in a TP 211, 212, 213 out of the one or more TPs 211, 212, 213, uses one unique signal from the set of sequences used in this TP 211, 212, 213.

In some embodiments, the second beam-specific reference signals are mutually orthogonal.

In some embodiments, the set of selected TP beams that are selected by the network node 211, 230 belong to one of: the same TP 211, 212, 213, different TPs 211, 213 within the cell 221, and different TP beams in different cells 221, 222.

Action 409

The wireless device 250 may receive a configuration from the network node 211, 230 to only report detected TP beams within a certain group. In some embodiments, this action may be implemented by receiving an RRC or broadcast control message, from the network node 211, 230.

In some embodiments, selecting the preset of detected TP beams may be based on one of: a threshold value for a measured variable in the detected TP beams, and a maximum number of TP beams.

Action 410

The wireless device 250 may receive from the network node 211, 230 the trigger for the report. As stated earlier, in some embodiments, this action may be implemented by receiving a DCI message, from the network node 211, 230.

Action 411

The wireless device 250 may measure the channel state information for the set of selected TP beams, based on the configured set of second beam-specific reference signals.

Action 412

The wireless device 250 may send the report to the network node 211, 230, the report comprising channel state information for at least the subset of the set of selected TP beams, measured on the configured set of second beam-specific reference signals.

In some embodiments, the report comprises at least one index to the precoding codebook.

Action 413

The wireless device 250 may receive the scheduling message from the network node 211, 230, wherein the message is based on the sent report.

By the network node doing a pre-selection of possible beams, only beams that are likely to be used in the data transmission by the network node to the wireless device are selected. Thus, by at least some of the steps or actions described herein, the wireless device 250 may quickly switch from one TP beam to another TP beam which improves mobility and gives diversity for both data and control signalling.

One of the main advantages of embodiments herein disclosed here may be that the overhead for quality estimates may be reduced. By doing a pre-selection of possible beams, e.g., the first step of the reporting procedure described above, or actions 304, 404, only beams that are likely to be used in the data transmission is selected. When possible TP-beam candidates have been selected, detailed CSI may be reported more frequently. This in contrast to if detailed CSI should be reported from all TP-beams which would require a substantial overhead.

Thus, the problem identified in the prior art on how to select transmission points and beams within each transmission point in a dynamic manner, without the need to frequently change the serving transmission point, is addressed by at least some of the embodiments herein by allowing the set of selected or configured TP beams in the second step, or in action 304, to belong to multiple transmission points so that a good connection is likely to be present at least one of the transmission points and that the network, e.g., the network node 211, 230, may quickly switch the transmission to another beam in another transmission point, without a need for changing serving transmission point.

Also, the problem identified in the prior art on how to provide coverage and robust reception of synchronization signals and reference signals needed to ensure mobility in the 5G network is addressed by at least some of the embodiments herein by providing, or transmitting, beamformed PSS and SSS signals with narrow beams, and thus extended coverage, and at the same time allowing for detecting the PSS and SSS without prior knowledge, i.e., blind detection, of the utilized beamforming weights, or used PSS or SSS sequences. Hence, new TP beams may be detected and reported to the network node 211, 230 when the wireless device 250 moves around, and a new TP becomes discoverable, within the range of the wireless device 250.

Figure 5:
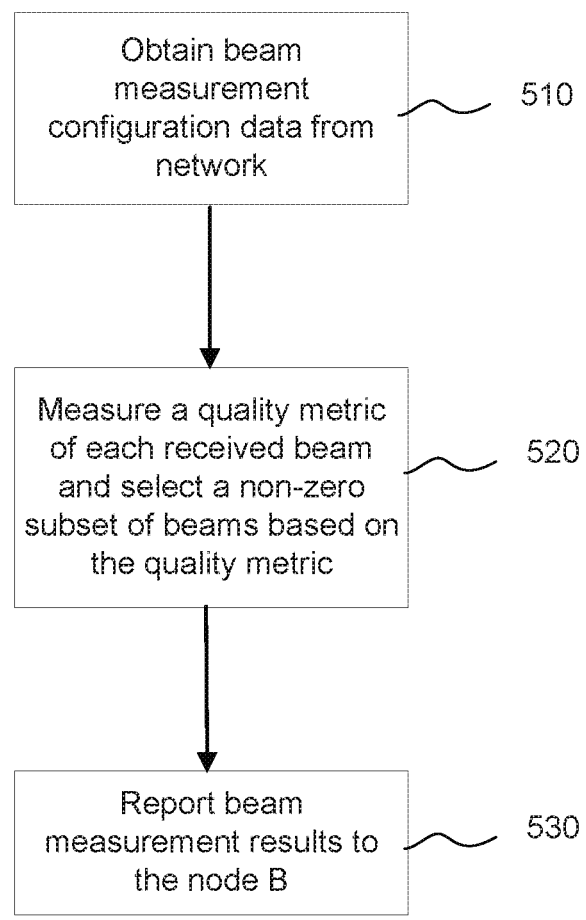
FIG. 5 is a schematic diagram illustrating embodiments of a method in a wireless communications network, according to some embodiments.
Figure 6:
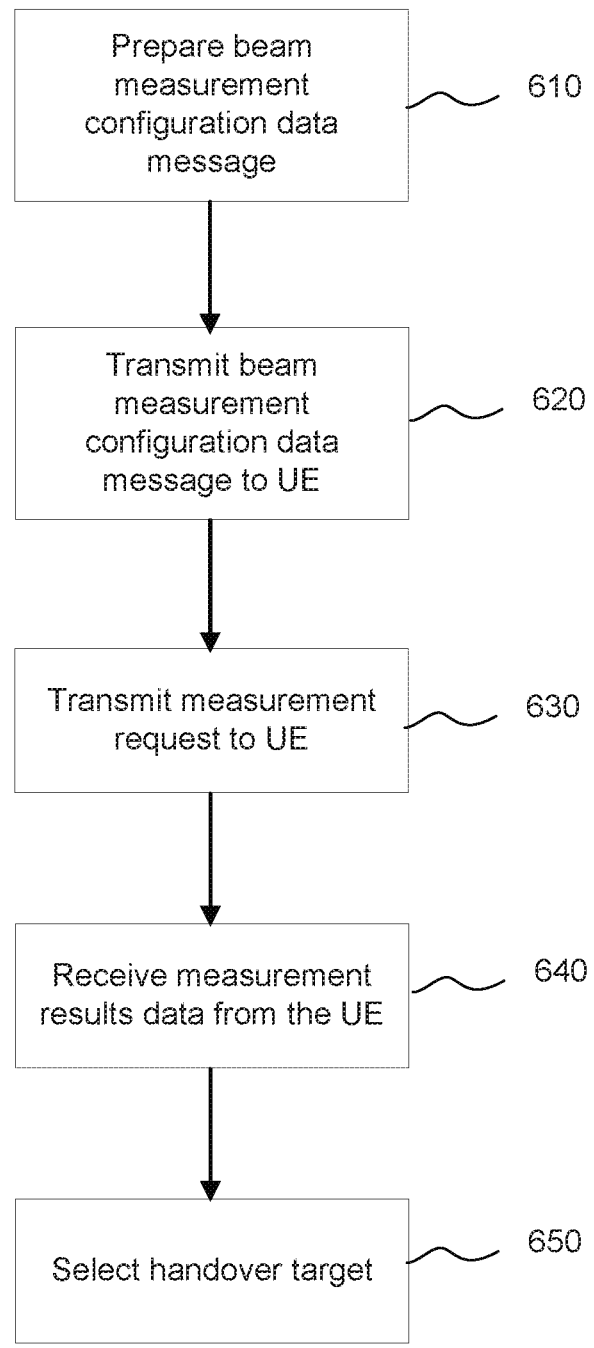
FIG. 6 is a schematic diagram illustrating embodiments of a method in a wireless communications network, according to some embodiments.

FIG. 5 and FIG. 6 depict, respectively, schematic diagrams of methods in the network node 211, 230 and the wireless device 250, according to some embodiments herein, and as just described in reference to FIGS. 3 and 4, respectively. In the exemplary non-limiting example of FIG. 5, the wireless device 250, depicted as "UE" in FIGS. 5 and 6, measures TP-beams specific signals, such as the first beam-specific reference signals. The wireless device 250 then selects a preset of the measured TP beams as explained in action 404, based on e.g., received power, and sends the prereport to the network node 211, 230, that is the "report of K selected TP-beams", according to action 405. The network node 211, 230, depicted as "Network" in FIGS. 5 and 6, performs a selection of D TP beams, as described in action 304, according to the preset selected by the wireless device 250. The network node 211, 230 then configures the wireless device 250 with a number D of CSI-RS signals, that is the the set of second beam-specific reference signals, as in action 305. The wireless device 250 then measures the CSI-RS on the set of selected TP beams, as in action 411. After having optionally received a trigger from the network node 211, 230, the wireless device 250 then sends the report to the network node, the CSI report based on the CSI-RS, as in action 412. Based on the CSI-RS report, the network node 211, 230 then sends a scheduling of downlink based on the received CSI-RS report, as in actions 309 and 413.

In the exemplary non-limiting example of FIG. 6, the network node 211, 230 configures the wireless device 250 with the beam-specific uplink reference signals as described in action 302, which in this embodiment are beam-specific SRS. The wireless device 250 then transmits the beam-specific uplink reference signals, beam-SRS, as in action 407. The network node 211, 230 performs the selection of action 304 according to the measurement of the transmission by the wireless device 250, of the beam-specific uplink reference signals configured by the network node 211, 230, which in this example are beam-specific SRS, or beam-SRS, as described in action 303, and selects D downlink TP-beams, as described in action 304. The network node 211, 230 then configures the wireless device 250 with the D CSI-RS signals, as discussed in action 305. The wireless device 250 then measures the CSI-RS on the set of selected TP beams, as in action 411. After having optionally received the trigger from the network node 211, 230 described in action 306, the wireless device 250 then sends the report to the network node, the CSI report based on the CSI-RS, as in action 412. Based on the CSI-RS report, the network node 211, 230 then sends a scheduling of downlink based on the received CSI-RS report, as in actions 309 and 413.

To perform the method actions described above in relation to FIGS. 3, 5 and 6, the network node 211, 230 is configured to receive the report from the wireless device 250. The network node 211, 230 comprises the following arrangement depicted in FIG. 7. The network node 211, 230 is configured to control the one or more Transmission Points, TPs, 211, 212, 213. The one or more TPs 211, 212, 213 are configured to transmit TP beams. The network node 211, 230 and the wireless device 250 are configured to operate in the wireless communications network 200. The detailed description of some of the following corresponds to the same references provided above, in relation to the actions described for the network node 211, 230, and will thus not be repeated here.

In some embodiments, the network node 211, 230 is one of: the TP 211 and the scheduling network node 230.

In some embodiments, as stated earlier, any of the first beam-specific reference signals and the second beam-specific reference signals are one of: channel state information reference signals, positioning reference signals, Primary Synchronization Signals and Secondary Synchronization Signals.

The network node 211, 230 may be configured to select the set of TP beams from the TP beams, wherein to select is based on at least one of: one or more measurements by the wireless device 250 on first beam-specific reference signals of the TP beams, and a transmission from the wireless device 250 configured to be measured by the one or more TPs 211, 212, 213. To select may be configured to be performed for the wireless device 250 to perform one or more measurements on the set of second beam-specific reference signals. The first beam-specific reference signals of the TP beams are defined so that each beam in a TP 211, 212, 213 out of the one or more TPs 211, 212, 213, uses one unique signal from a set of sequences used in this TP 211, 212, 213.

In some embodiments, this may be performed by a selecting module 701 comprised in the network node 211, 230.

In some embodiments, the second beam-specific reference signals are mutually orthogonal.

In some embodiments, the first beam-specific reference signals are detectable by the wireless device 250 without being in connected mode to the one or more TPs 211, 212, 213 configured to transmit the TP beams comprising the first beam-specific reference signals.

In some embodiments, the first beam-specific reference signals are grouped, and wherein the first beam-specific reference signals within one group are configured to be used within one cell 221 only.

In some embodiments, the network node 211, 230 is further configured to select one uplink beam from the uplink beams configured to be transmitted by the wireless device 250 for scheduling of uplink transmission.

This may also be performed by the selecting module 701.

In some embodiments, to select the uplink beam is based on the correlation of each of the uplink beams configured to be transmitted by the wireless device 250 with each beam-specific uplink signal.

In some embodiments, the selected set of TP beams from the TP beams belong to one of: the same TP 211, 212, 213, different TPs 211, 213 within the cell 221, and different TP beams in different cells 221, 222.

The network node 211, 230 may be configured to configure the wireless device 250 with the set of second beam-specific reference signals, wherein the set of second beam-specific reference signals are beam-specific downlink reference signals, and wherein each second beam-specific reference signal is associated with the selected TP beam of the set of TP beams.

In some embodiments, this may be performed by a configuring module 702 comprised in the network node 211, 230.

In some embodiments, the transmission from the wireless device 250 is done in uplink beams, and the network node 211, 230 is further configured to configure the wireless device 250 with the beam-specific uplink reference signals, so that the network node 211, 230 can measure on these beam-specific uplink reference signals.

This may also be performed by the configuring module 702.

In some embodiments, the beam-specific uplink reference signals are beam-specific sounding reference signals.

The network node 211, 230 may be configured to receive the report from the wireless device 250, the report comprising channel state information for at least the subset of the selected set of TP beams, measured on the configured set of second beam-specific reference signals.

In some embodiments, this may be performed by a receiving module 703 comprised in the network node 211, 230.

In some embodiments, the report comprises at least one index to the precoding codebook.

In some embodiments, the network node 211, 230 is further configured to receive the prereport from the wireless device 250 of the detected TP beams by the wireless device 250, and wherein to select the set of TP beams by the network node 211, 230, based on the first beam-specific reference signals of the TP beams, comprises to select the set of TP beams at least based on the prereport configured to be received from the wireless device 250.

In some embodiments, this may also be performed by the receiving module 703.

In some embodiments, the preset of detected TP beams comprised in the received prereport has been selected by the wireless device 250 based on the first beam-specific reference signals of the TP beams, wherein the first beam-specific reference signals are downlink beam-specific reference signals.

In some embodiments, the network node 211, 230 may be configured to schedule the wireless device 250, based on the received report.

In some embodiments, this may be performed by a scheduling module 704 comprised in the network node 211, 230.

In some embodiments, the network node 211, 230 may be configured to measure the transmission from the wireless device 250, and to select the set of TP beams by the network node 211, 230 based on the transmission from the wireless device 250 configured to be measured is based on one or more measurements on uplink reference signals.

In some embodiments, this may be performed by a measuring module 705 comprised in the network node 211, 230.

In some embodiments, wherein the transmission from the wireless device 250 is done in uplink beams, the network node 211, 230 is further configured to measure the transmission by the wireless device 250 of the beam-specific uplink reference signals.

In some embodiments, this may also be performed by the measuring module 705.

In some embodiments, to measure is configured to be done blindly on received signals, without configuring uplink sounding reference signals.

In some embodiments, the network node 211, 230 may configured to trigger the report from the wireless device 250.

In some embodiments, this may be performed by a triggering module 706 comprised in the network node 211, 230.

Figure 7:
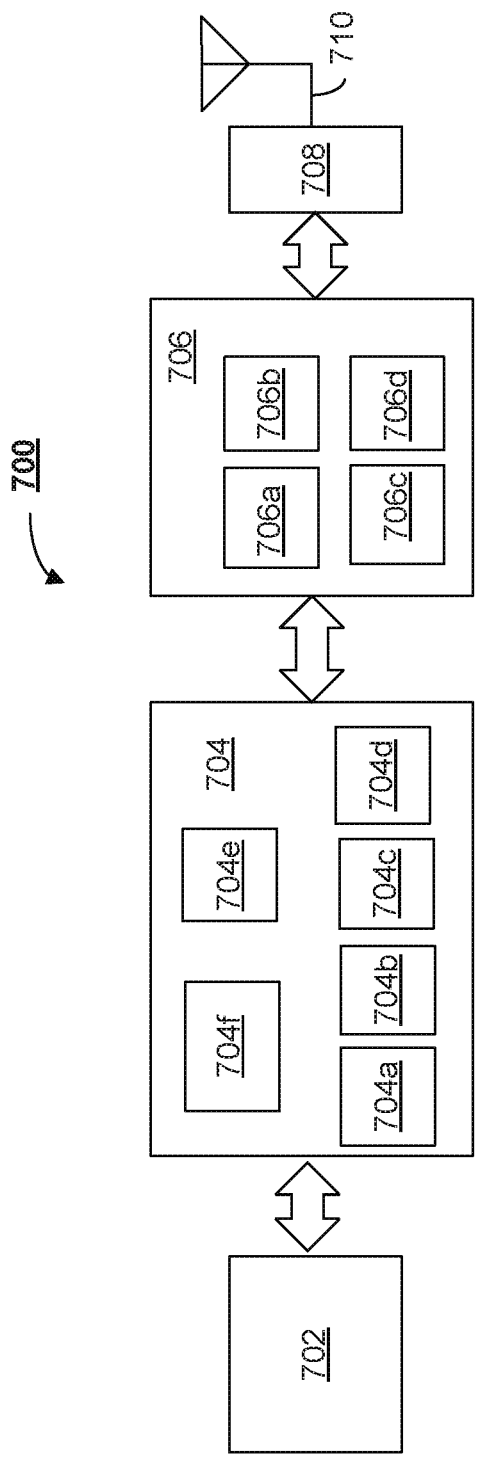
FIG. 7 is a block diagram of a network node that is configured according to some embodiments.

The embodiments herein for receiving the report from the wireless device 250 may be implemented through one or more processors, such as the processing module 707 in the network node 211, 230 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the in the network node 211, 230. One such carrier may be in the form of a CD ROM disc. It may be however feasible with other data carriers such as a memory stick. The computer program code may furthermore be provided as pure program code on a server and downloaded to the network node 211, 230.

The network node 211, 230 may further comprise a memory module 708 comprising one or more memory units. The memory module 708 may be arranged to be used to store data in relation to applications to perform the methods herein when being executed in the network node 211, 230. Memory module 708 may be in communication with the processing module 707. Any of the other information processed by the processing module 707 may also be stored in the memory module 708.

In some embodiments, information may be received from, e.g., the wireless device 250, through a receiving port 709. In some embodiments, the receiving port 709 may be, for example, connected to the one or more antennas in the network node 211, 230. In other embodiments, the network node 211, 230 may receive information from another structure in the wireless communications network 200 through the receiving port 709. Since the receiving port 709 may be in communication with the processing module 707, the receiving port 709 may then send the received information to the processing module 707. The receiving port 709 may also be configured to receive other information.

The information processed by the processing module 707 in relation to the embodiments of method herein may be stored in the memory module 708 which, as stated earlier, may be in communication with the processing module 707 and the receiving port 709.

The processing module 707 may be further configured to transmit or send information to e.g., the wireless device 250, or another node in the wireless communications network 200, through a sending port 710, which may be in communication with the processing module 707, and the memory module 708.

Those skilled in the art will also appreciate that the different modules 701-706 described above may refer to a combination of analog and digital modules, and/or one or more processors configured with software and/or firmware, e.g., stored in memory, that, when executed by the one or more processors such as the processing module 707, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, the methods according to the embodiments described herein for the network node 211, 230 are respectively implemented by means of a computer program product, comprising instructions, i.e., software code portions, which, when executed on at least one processor, cause the at least one processor to carry out the actions described herein, as performed by the network node 211, 230. The computer program product may be stored on a computer-readable storage medium. The computer-readable storage medium, having stored thereon the computer program, may comprise instructions which, when executed on at least one processor, cause the at least one processor to carry out the actions described herein, as performed by the network node 211, 230. In some embodiments, the computer-readable storage medium may be a non-transitory computer-readable storage medium.

To perform the method actions described above in relation to FIGS. 4, 5 and 6 the wireless device 250 is configured to send the report to the network node 211, 230. The wireless device 250 comprises the following arrangement depicted in FIG. 8. The network node 211, 230 is configured to control the one or more Transmission Points, TPs, 211, 212, 213. The one or more TPs 211, 212, 213 are configured to transmit TP beams. Each of TP beams has the first beam-specific reference signal. The network node 211, 230 and the wireless device 250 are configured to operate in the wireless communications network 200. The detailed description of some of the following corresponds to the same references provided above, in relation to the actions described for the wireless device 250, and will thus not be repeated here.

In some embodiments, the network node 211, 230 is one of: the TP 211 and the scheduling network node 230.

In some embodiments, any of the first beam-specific reference signals and the second beam-specific reference signals are one of channel state information reference signals, positioning reference signals, Primary Synchronization Signals and Secondary Synchronization Signals.

The wireless device 250 may be configured to receive a configuration from the network node 211, 230 with the set of second beam-specific reference signals, wherein the set of second beam-specific reference signals are beam-specific downlink reference signals, wherein each second beam-specific reference signal is associated with one of the selected set of TP beams, selected by the network node 211, 230 based on at least one of: one or more measurements by the wireless device 250 on first beam-specific reference signals of the TP beams, and a transmission from the wireless device 250 configured to be measured by the one or more TPs 211, 212, 213, wherein the first beam-specific reference signals of the TP beams are defined so that each beam in a TP 211, 212, 213 out of the one or more TPs 211, 212, 213, uses one unique signal from a set of sequences used in this TP 211, 212, 213, The configuration may be for the wireless device 250 to perform one or more measurements on the set of second beam-specific reference signals.

In some embodiments, this may be performed by a receiving module 801 comprised in the wireless device 250.

In some embodiments, the second beam-specific reference signals are mutually orthogonal.

In some embodiments, the wireless device 250 is further configured to receive the scheduling message from the network node 211, 230, wherein the message is based on the report configured to be sent.

This may also be performed by the receiving module 801.

In some embodiments, the set of selected TP beams configured to be selected by the network node 211, 230 at least based on the transmission configured to be measured from the wireless device 250, is based on one or more measurements on uplink reference signals.

In some embodiments, the first beam-specific reference signals are grouped, and wherein the first beam-specific reference signals within one group are configured to be used within one cell only 221.

In some embodiments, the transmission from the wireless device 250 is configured to be done in uplink beams, wherein the uplink reference signals are beam-specific uplink reference signals and the wireless device 250 is further configured to receive the configuration from the network node 211, 230 with the beam-specific uplink reference signals. The network node 211, 230 can then measure on these beam-specific uplink reference signals.

This may also be performed by the receiving module 801.

In some embodiments, the beam-specific uplink reference signals are beam-specific sounding reference signals.

In some embodiments, the wireless device 250 is further configured to receive from the network node 211, 230 the trigger for the report.

This may also be performed by the receiving module 801.

In some embodiments, the set of selected TP beams that are selected by the network node 211, 230 belong to one of: the same TP 211, 212, 213, different TPs 211, 213 within the cell 221, and different TP beams in different cells 221, 222.

In some embodiments, the report comprises at least one index to the precoding codebook.

In some embodiments, the Primary Synchronization Signals, positioning reference signals or the Secondary Synchronization Signals are grouped into sets of the defined number of sequences, and wherein each of these sets of the defined number of sequences is configured to be restricted to be used within one TP 211, 212, 213 only.

The wireless device 250 may be configured to send the report to the network node 211, 230, the report comprising channel state information for at least the subset of the set of selected TP beams, configured to be measured on the configured set of second beam-specific reference signals.

This may be performed by a sending module 802 comprised in the wireless device 250.

In some embodiments, the wireless device 250 is further configured to send the prereport of the selected preset of detected TP beams to the network node 211, 230. The set of selected TP beams may be configured to be selected by the network node 211, 230 at least based on the prereport configured to be sent.

This may also be performed by the sending module 802.

In some embodiments, the preset of detected TP beams comprised in the sent prereport is configured to have been selected by the wireless device 250 based on the first beam-specific reference signals of the TP beams, wherein the first beam-specific reference signals are downlink beam-specific reference signals.

In some embodiments, the wireless device 250 may be configured to search for TP beams.

This may be performed by a searching module 803 comprised in the wireless device 250.

In some embodiments, the wireless device 250 may be configured to detect the TP beams.

This may be performed by a detecting module 804 comprised in the wireless device 250.

In some embodiments, the first beam-specific reference signals are detectable by the wireless device 250 without being in connected mode to the one or more TPs 211, 212, 213 configured to transmit the TP beams comprising the first beam-specific reference signals.

In some embodiments, the wireless device 250 may be configured to select the preset of detected TP beams.

This may be performed by a selecting module 805 comprised in the wireless device 250.

In some embodiments, the wireless device 250 is further configured to receive the configuration from the network node 211, 230 to only report detected TP beams within the certain group. This may also be performed by the receiving module 801.

In some embodiments, wherein the wireless device 250 is further configured to select the preset of detected TP beams based on one of: the threshold value for the measured variable in the detected TP beams, and the maximum number of TP beams.

This may also be performed by the selecting module 805.

In some embodiments, the wireless device 250 may be configured to transmit the uplink reference signals.

In some embodiments, the wireless device 250 may be configured to transmit the beam-specific uplink reference signals.

This may be performed by a transmitting module 806 comprised in the wireless device 250.

In some embodiments, the wireless device 250 may be configured to identify the cell 221 by detecting the TP beam belonging to that cell 221.

This may be performed by an identifying module 807 comprised in the wireless device 250.

In some embodiments, the wireless device 250 may be configured to measure the channel state information for the set of selected TP beams, based on the configured set of second beam-specific reference signals.

This may be performed by a measuring module 808 comprised in the wireless device 250.

The embodiments herein for send the report to the network node 211, 230 may be implemented through one or more processors, such as the processing module 809 in the wireless device 250 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the in the wireless device 250. One such carrier may be in the form of a CD ROM disc. It may be however feasible with other data carriers such as a memory stick. The computer program code may furthermore be provided as pure program code on a server and downloaded to the wireless device 250.

The wireless device 250 may further comprise a memory module 810 comprising one or more memory units. The memory module 810 may be arranged to be used to store data in relation to applications to perform the methods herein when being executed in the wireless device 250. Memory module 810 may be in communication with the processing module 809. Any of the other information processed by the processing module 809 may also be stored in the memory module 810.

In some embodiments, information may be received from, e.g., the network node 211, 230, through a receiving port 811. In some embodiments, the receiving port 811 may be, for example, connected to the one or more antennas in the wireless device 250. In other embodiments, the wireless device 250 may receive information from another structure in the wireless communications network 200 through the receiving port 811. Since the receiving port 811 may be in communication with the processing module 809, the receiving port 811 may then send the received information to the processing module 809. The receiving port 811 may also be configured to receive other information.

The information processed by the processing module 809 in relation to the embodiments of method herein may be stored in the memory module 810 which, as stated earlier, may be in communication with the processing module 809 and the receiving port 811.

The processing module 809 may be further configured to transmit or send information to e.g., the network node 211, 230, through a sending port 812, which may be in communication with the processing module 809, and the memory module 810.

Those skilled in the art will also appreciate that the different modules 801-808 described above may refer to a combination of analog and digital modules, and/or one or more processors configured with software and/or firmware, e.g., stored in memory, that, when executed by the one or more processors such as the processing module 809, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, the methods according to the embodiments described herein for the wireless device 250 are respectively implemented by means of a computer program product, comprising instructions, i.e., software code portions, which, when executed on at least one processor, cause the at least one processor to carry out the actions described herein, as performed by the wireless device 250, The computer program product may be stored on a computer-readable storage medium. The computer-readable storage medium, having stored thereon the computer program, may comprise instructions which, when executed on at least one processor, cause the at least one processor to carry out the actions described herein, as performed by the wireless device 250. In some embodiments, the computer-readable storage medium may be a non-transitory computer-readable storage medium.

When using the word "comprise" or "comprising" it shall be interpreted as non-limiting, i.e. meaning "consist at least of".

The modules described may be for performing any of the pertinent embodiments described.

The embodiments herein are not limited to the above described preferred embodiments. Various alternatives, modifications and equivalents may be used. Therefore, the above embodiments should not be taken as limiting the scope of the invention.

The invention claimed is:

1. An apparatus for use in a user equipment (UE) of a wireless telecommunications network having at least one NodeB, the apparatus comprising:

beam measurement circuitry to:
receive at the UE, from the network, beam measurement configuration data requesting a selection of a non-zero integer number, N, transmit-receive beam pairs by the UE; and
measure, in response to a measurement request from the network, signal qualities for various combinations of a first plurality of transmit beams originating from a beam source of the network and a second plurality of receive beams of the UE, to select N transmit-receive beam pairs to evaluate a cell, the selection of the N transmit-receive beam pairs depending upon the signal quality measurements; and
feedback circuitry to transmit, to one or more devices of the wireless telecommunication network, a measurement report based on the measured signal qualities.

2. The apparatus of claim 1, wherein the measurement report is to specify the N selected transmit-receive beam pairs.

3. The apparatus of claim 1, wherein the beam source is one of a New Radio NodeB, an evolved NodeB or a transmission reception point, TRP.

4. The apparatus of claim 1, wherein a type of signal measurement performed in response to the measurement request depends upon the beam measurement configuration data.

5. The apparatus of claim 1, wherein the measured signal qualities associated with a given selected transmit-receive beam pair comprises: a unique beam identifier to uniquely identify a transmit beam amongst transmit beams of all beam sources in communication range of the UE; or a combination of an identifier of the beam source and a non-unique beam identifier for a transmit beam of the identified beam source.

6. The apparatus of claim 1, wherein the beam measurement configuration data relate to transmit beams corresponding to different ones of a plurality of beam sources located within communication range of the UE.

7. The apparatus of claim 6, wherein the beam measurement configuration data is to specify that beam measurement results are to include a non-zero integer K of selected transmit-receive beam pairs, and beam pair selection is to be performed by the UE collectively for all transmit beams corresponding to two or more of the plurality of beam sources.

8. The apparatus of claim 6, wherein the beam measurement configuration data is to specify: selection of only one transmit-receive beam pair between the UE and a corresponding beam source.

9. The apparatus of claim 1, wherein to select the N transmit-receive beam pairs, the beam measurement circuitry is to determine the signal quality measurements are above a predetermined threshold value.

10. The apparatus of claim 9, wherein the beam measurement configuration data is to specify the predetermined threshold value.

11. The apparatus of claim 1, wherein the beam measurement circuitry is to select the N transmit-receive beam pairs based on the signal quality measurements being greater than a signal quality measurement of an active transmit-receive beam pair.

12. The apparatus of claim 1, wherein the beam measurement circuitry is to select the N transmit-receive beam pairs based on the selected transmit-receive beam pairs having a signal quality greater by at least a predetermined difference in magnitude relative to an active transmit-receive beam pair, the predetermined difference in magnitude to be specified in the beam measurement configuration data.

13. The apparatus of claim 12, wherein the predetermined difference in magnitude for the beam selection is separately configurable by the network in the beam measurement configuration data for each of a plurality of beam sources.

14. The apparatus of claim 1, wherein the signal quality measured in response to the measurement request comprises at least one of: a reference signal received power (RSRP); a reference signal received quality (RSRQ); a received signal strength indicator (RSSI); a signal strength threshold; a relative signal strength threshold; an absolute threshold; or a difference from a predetermined benchmarking signal.

15. A UE comprising:
a display screen; and
the apparatus of claim 1.

16. Machine-readable instructions provided on at least one non-transitory, machine-readable medium, the machine-readable instructions, when executed by a user equipment, UE, of a wireless telecommunications network having at least one NodeB, to cause processing hardware of the UE to:
obtain, from the network, beam measurement configuration data specifying a non-zero integer, N, transmit-receive beam pairs to be selected based on selection criteria; and
measure, in response to a measurement request from the network, a quality metric of at least one transmit-receive beam pair corresponding to a transmit beam from a beam source of the network and a receive beam of the UE to provide for selection of N selected transmit-receive beam pairs depending upon the quality metric, the selection to be performed at the UE based upon the beam measurement configuration data.

17. Machine-readable instructions as claimed in claim 16, to cause processing hardware of the UE to report, from the UE to the network, beam measurement results wherein a content of the beam measurement results depends upon the beam measurement configuration data.

18. Circuitry for use in a NodeB of a wireless telecommunications network, the circuitry comprising:
processing circuitry to prepare a beam measurement configuration data message specifying a sequence of beam measurements to be performed by a user equipment (UE) to select at least one preferred transmit-receive beam pair from a plurality of transmit-receive beam pairs, the beam measurement configuration data message to specify a non-zero integer number, N, of preferred transmit-receive beam pairs to be determined for an active cell of the UE; and
transmission circuitry to:
transmit the beam measurement configuration data message to the UE; and
transmit a measurement request to the UE to trigger the UE to perform measurements of beam parameters according to the beam measurement configuration data to identify the N preferred transmit-receive beam pairs and to map the N preferred transmit-receive beam pairs to the active cell.

19. Circuitry for use in a NodeB as claimed in claim 18, comprising:
a receiver to receive from the UE in response to the measurement request, measurement results including the N preferred transmit-receive beam pairs for the active cell; and
wherein the processing circuitry is to identify as a handover target for the UE, at least one of the N preferred transmit-receive beam pairs.

20. Circuitry for use in a NodeB as claimed in claim 18, wherein the N preferred transmit-receive beam pairs are identified based upon a relative ranking of signal quality indicated by the beam parameter measurements, the ranking being performed depending upon a signal quality for an aggregated set of transmit-receive beam pairs corresponding to a plurality of transmit beams from a respective plurality of beam sources.

21. A NodeB of a wireless telecommunications network comprising:
  a transceiver; and
  circuitry for use in a NodeB as claimed in claim 18.

22. Machine-readable instructions provided on at least one non-transient machine-readable medium, the machine-readable instructions, when executed by a UE of a wireless telecommunications network, to cause processing hardware of the UE to:
  receive from the network, a beam measurement configuration message requesting a selection of a non-zero integer number, N, of transmit-receive beam pairs by the UE;
  measure, in response to a measurement request from the network, parameters corresponding a plurality of transmit-receive beam pairs based on various combinations of transmit beams detectable at the UE and receive beams of the UE; and
  choose N transmit-receive beam pairs to characterize an active cell of the UE, the choice of the N transmit-receive beam pairs depending upon the measured beam parameters.

23. Machine-readable instructions as claimed in claim 22, wherein the beam measurement configuration message specifies the parameters to choose the N transmit-receive beam pairs depending upon: a highest signal strength, a signal strength greater than or equal to a current connection, a signal quality threshold, at least a minimum difference between a measured signal strength, or a comparative signal strength relative to an active signal.

\* \* \* \* \*

UNITED STATES PATENT AND TRADEMARK OFFICE
CERTIFICATE OF CORRECTION

Page 1 of 36

PATENT NO. : 11,006,304 B2
APPLICATION NO. : 16/093019
DATED : May 11, 2021
INVENTOR(S) : Candy Yiu et al.

It is certified that error appears in the above-identified patent and that said Letters Patent is hereby corrected as shown below:

In the Specification

Column 1, Line 1 - Column 26, Line 62, delete the specification and substitute therefore with the attached specification.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*

BEAM MEASUREMENT IN A WIRELESS COMMUNICATION NETWORK

TECHNICAL FIELD

Various embodiments generally may relate to the field of wireless communications and, more particularly, to beam measurement.

BACKGROUND

Wireless communications standards such as the third generation partnership project (3GPP) Long Term Evolution, LTE and LTE-Advanced (LTE-A) wireless telecommunication technologies may use Multiple Input Multiple Output (MIMO), which employs multiple transmit antennas and multiple receive antennas to provide high data rates. Beamforming is a MIMO technique that may allow transmissions to be focused on specific areas of a cell by using multiple antennas to control the direction of a transmitted wireless signal by appropriately weighting the magnitude and phase of individual antenna signals. The signals may be weighted so that they can be added constructively in the direction of a target transmitter or receiver and can be added destructively in the direction of potentially interfering devices. Beamforming may involve sweeping a narrow beam signal sequentially through an angular range or may involve parallel transmission of multiple beams in a single cell or cell sector.

As wireless communication standards evolve from fourth generation (4G) to fifth generation (5G) and beyond, it is likely that network capacity will be expanded by making use of higher frequency radio waves than the range currently used by LTE and LTE-A. For example, it has been suggested that frequencies above 6 GHz (cm wave) or above 10 GHz (mm wave) could be used. Millimeter wave (mmW) and centimeter wave communication has been considered as an important technology to be employed for the future 5G mobile system because they offer more spectrum relative to congested ultra-high frequency and microwave frequencies below 3GHz and may be used to provide high throughput in small geographic areas. The 5G wireless communication standards may be referred to as New Radio (NR) access technology instead of being referred to as LTE. One of the problems related to such high frequency transmission (e.g. mmW or cm) is the severe path loss and the limited penetration capability, which reflects into a limited coverage capability (i.e., the coverage radius is reduced). In order to cope with this, very narrow bandwidths, with high beamforming gains may be used. Narrow beams with high gains are beneficial for the coverage distance, but they can be susceptible to shadowing. Furthermore mmW/cmW cells (or transmission reception points) are small in size relative to macro-cells associated with an eNodeB and cell coverage may be "patchy" in the small cells, although coverage holes may be filled by a 4G macro-cell. As a consequence frequent handovers between different mmW/cmW transmission points and are expected to occur as well as frequent cross-technology (e.g. 3G, 4G, 5G, Wi-Fi) handovers.

BRIEF DESCRIPTION OF THE DRAWINGS

Embodiments described herein are illustrated by way of example, and not by way of limitation, in the figures of the accompanying drawings in which like reference numerals refer to similar elements:

Figure 1 schematically illustrates establishing appropriate beam pairs between a NodeB and a UE in a wireless communications network;

Figure 2 schematically illustrates a scenario where a UE is within range of only a single beam source;

Figure 3 schematically illustrates a wireless communications network in which a given cell corresponding to a coverage area of an eNodeB or a gNodeB comprises multiple high frequency (short range) transmission reception points (TRPs);

Figure 4 schematically illustrates an apparatus arrangement for performing a communication between a beam source 400 and a UE;

Figure 5 is a flowchart schematically illustrating a method for performing beam measurement for use in a UE of a wireless telecommunications network;

Figure 6 is a flowchart schematically illustrating a method for performing beam measurement configuration for use in a gNodeB of a wireless telecommunications network; and Figure 7 schematically illustrates components of an electronic device 700 to be incorporated into, or otherwise be a part of a UE, an eNodeB, a gNodeB or a transmission reception point.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

The 5G network of the next generation requirement (NR access technology) is intended to increase throughput, coverage and robustness. As legacy (e.g. 4G) cellular network frequencies are saturated, high frequency such as mmWave is an attractive choice due to its high bandwidth. However, due to the high path loss, beamforming both at the network and UE are appropriate to increase its antenna gain to compensate its poor propagation. In some examples the UE may be capable of beamforming but in alternative examples the UE may be omni-directional for at least one of transmission or reception. When both network (e.g. gNodeB, nodeB, mmW small cell, multi-beam transmission reception point) and UE are beamforming, there are many challenges and one of them is discovery and measurement. In embodiments, a legacy LTE measurement mechanism may be reused. Such legacy LTE measurements may comprise using reference signals such as UE-specific demodulation reference signals (DMRS) before precoding or cell-specific channel state information reference signals (CSI-RS) after precoding in a common downlink channel (e.g. physical downlink shared channel PDSCH) to determine a channel quality metric in the receiver. Alternatively, new signaling design may also be introduced for 5G such as xSS (Synchronisation Signal) and additional reference signals (RS) which may be Primary Synchronisation Signal (PSS), Secondary Synchronisation Signal SSS and CSI-RS. However, in LTE the UE may be actually measuring the beam but not the beams evaluated to a cell, such as the serving cell for the UE performing the measurements. Embodiments herein may provide how the beam(s) may map to a cell, such as a cell corresponding to a NodeB (e.g. a 4G eNodeB or a 5G gNodeB or a subsequent generation NodeB) in order for the UE to report in the measurement report. For example the network may configure the UE to measure received beams from a beam source (the UE may imply receive beams without being aware of particular beam sources) and to select as "best" beams a predetermined non-zero integer number (N) of beams. The N beams are effectively evaluated for a cell, such as a serving cell of the UE in response to a measurement event for the cell being triggered by the network. The N best beams may be used to characterize the active cell , for example, by providing an indication of signal qualities of best beams detectable by a UE in the cell. A measurement report may be sent back to the network in response to the measurement event trigger. The measurement report may or may not include the result for the N selected beams.

In legacy networks, LTE operation is such that the UE may perform measurement of a cell, such as measuring a signal quality associated with a cell-specific reference signal. In New RAT/5G, each cell may contain multiple beams, such as multiple beams from a multi-antenna array of a single transmitter. A transmission reception point (TRP) may be a base station such as, for example, an NR NodeB (sometimes denoted 5G NodeB or gNodeB or gNB). In other examples, the TRP may be a component of a base station such as a gNodeB. A TRP may be part of a distributed base station arrangement comprising a Central Unit (CU) and a Distributed Unit (DU). In some such examples, the CU may comprise a gNodeB and the DU comprise a TRP (or antenna arrangement) at a site remote from the corresponding CU. In this case the CU may serve a function similar to a radio access network controller. An NR cell may have a single TRP or may have multiple TRPs. A beam source such as a TRP or a gNodeB may comprise multiple beamformers and each beamformer may generate a beams having a fixed bandwidth or a variable bandwidth and may transmit beams in a plurality of different directions. A beam source may transmit only a single beam or may transmit multiple beams. Beamformers of a multi-beam TRP may be equipped with a codebook of beams having different widths and beamforming gains. A reduced beamwidth implies an increased gain and vice versa. One way of performing channel estimation is to transmit a known reference signal or pilot signal and detect the received signal. Alternatively a channel matrix can be used to mathematically correlate a transmitted signal and a received signal.

Measurement feedback circuitry in a receiving UE may derive information from channel estimation circuitry in the UE to allow a received signal quality of each of a plurality of different transmitted beamwidths to be measured. Measurement information for at least a subset of the received beamwidths may be fed back to the network via a NodeB. For example, measurement information from only a predetermined number of the highest quality received signals could be fed back to the NodeB to inform the selection of an appropriate beamwidth by one or more of the beamformers or to identify one or more appropriate target handover beams. In some embodiments a cell specific signal may be used for an NR synchronization signal denoted xSS, which may be analogous to PSS/SSS in LTE. Additional reference symbols may be used as well as xSS, such as CSI-RS. The PSS/SSS may contain a cell ID, so the CSI-RS need not contain the cell ID in examples according to the present technique. The network may be configured to provide a cell ID map to CSI-RS since CSI-RS may not include the cell ID. Based on beam measurements performed by the receiving UE, at least one of a wideband Channel Quality Indicator (CQI), a subband Channel Quality Indicator a reference signal receive power (RSRP) measurement or a reference signal receive quality (RSRQ) for one or more received beam may be reported back to the network via the serving cell NodeB. Measurements other than CQIs and RSRP may be used. Any signal quality metric may be used.

Below are the possible scenarios:

Scenario 1 (see Figure 1) : A cell, such as a cell associated with a given NodeB of the wireless telecommunications network contains 1 transmission reception point (TRP), which is one example of a beam source, but the beam source is not limited to a TRP.

Scenario 2 (see Figure 2): A cell contains multiple TRPs or multiple beam sources.

Considering first scenario 1 since it is simpler. Each cell (e.g. macro-cell) contains only 1 TRP, each TRP can have multiple beams as shown in Figure 1. Figure 1 schematically illustrates establishing appropriate beam pairs between a NodeB and a UE in a wireless communications network. The NodeB may be an gNodeB (5G), or alternatively an eNodeB(4G) or a subsequent generation NodeB. The arrangement of Figure 1 comprises a first gNodeB 110, a second gNodeB 120 and a UE 130. Each of the gNodeBs 110, 120 may capable of communicating at frequencies of 6Ghz and above such as cmW (above 6GHz) and/or mmW frequencies (above 10 GHz) as well as legacy frequencies of 6GHz and below. Each gNodeB 110,120 is capable of performing at least one of analogue or digital beamforming, which may comprise configuring beams in different directions in an angular range of up to 360° centred on the gNodeB. The beams illustrated in Figure 1 have equal angular widths and angular ranges merely for simplicity of illustration, but the beam parameters of individual beams transmitted by a given gNodeB 110, 120 may vary and beam parameters may differ between the different gNodeBs 110, 120. The beam parameters may include beamwidth, beam gain, beam frequency, beam phase, beam direction. A cell size associated with a gNodeB 110, 120 may depend upon a communication range and thus may be dependent upon a transmission frequency. A given cell may be divided into a plurality of sectors, with each sector having one or more corresponding transmission beams. Different antennas may serve different sectors.

Since high frequency signals such as mmW signals can be blocked by obstacles such as buildings and can be attenuated by the human body, the quality of a communication link between the UE 130 and one of the gNodeBs 110, 120 may be highly variable due to the presence of and movement of obstacles in the signal path and due to movement of the UE 130 itself. Robustness to sudden rapid drops in signal strength may be provided via multi-connectivity, which may involve monitoring the availability of multiple possible signal paths to different cells so that, for example, a sudden drop in a signal strength of a connection between the UE 130 and the gNodeB 110 can be ameliorated, for example, by handing over to a different beam-pair connecting to the same gNodeB 110 or by handing over to a better quality of connection between the UE 130 and the gNodeB 120. Furthermore, multi-connectivity may allow handovers between higher frequency 5G mmW cells and lower frequency 4G macro-cells communicating at below 3GHz, which offer more robust connections but comparatively lower bandwidth.

To overcome high isotropic pathloss at mmW frequencies, high directionality of transmission may be desirable at both the gNodeB 110, 120 and the UE 130. Accordingly, in the Figure 1 example arrangement, the UE 130 as well as the two gNodeBs 110, 120 are each capable of beamforming. Beamforming may be performed as analogue beamforming, where each transceiver may be able to look at only one direction per timeslot or as digital beamforming, where multiple beam directions can be processed in parallel or as hybrid beamforming, which combines both digital and analogue beamforming. In hybrid beamforming, at the receiver there is a plurality, S, of complete radio frequency chains so the hybrid receiver may be capable of operating as S analogue beamforming systems in parallel. In digital beamforming, although all received beam directions can be detected in a single timeslot, but this may require higher power consumption to support separate analogue to digital converters for each antenna element. The physical size of antennas at mmW frequencies make it practical to build vary large antenna arrays of, for example, 32 or more antennas, due to the shorter wavelengths allowing for more compact arrays.

As shown in Figure 1, there is a plurality Ntx of beams transmitted in different directions from each of the two gNodeBs 110, 120 and a plurality of Nrx different reception beam patterns that may be formed by the UE 130. The UE 130 may be capable of transmitting localised beams in different angular directions in parallel or may alternatively be capable of sequentially changing between different beam directions. The reception beamforming patterns of the UE 130 may relate to angles of arrival of the signal paths from the gNodeB 110, 120. In some examples, the UE may not be "aware" of a TRP or of Tx or Rx beams such that from the perspective of the UE, instead the UE may simply detect beams without having discovered TRPs or beam sources in the vicinity.

Determining a ranking of transmit (Tx) and receive (Rx) beam pairings between the UE 130 and the first gNodeB 110 or the second gNodeB 120 to order them in terms of predicted connection service quality may comprise the UE 130 performing signal quality measurements for at least a subset of the possible Ntx*Nrx beam pairs. The network and the UE may beamform in any one of a number of alternative ways without restriction. In some examples, the UE may perform blind detection of a network Tx beam using a UE Rx beam. In some examples, to detect a best (not necessarily optimal) transmit-receive direction, a gNodeB 110 120 may perform an exhaustive search comprising sequential beam searching in which both the UE 130 and the gNodeBs 110, 120 have a predefined codebook of Nrx or Ntx directions that cover the whole angular space and are used sequentially to transmit and receive. Alternatively, an iterative search may be performed in which progressively narrower beams are used by a gNodeB to search for a UE. In yet a further alternative, positioning coordinates, such as Global Positioning Satellite (GPS) coordinates of the gNodeBs 110, 120 may be communicated omni-directionally by an eNodeB (not shown) at lower frequencies. The UE 130, may acquire its own GPS coordinates and a connection between the UE and a geometrically closest gNodeB 110 or 120 may be formed that way. Thereafter signal quality measurements may be made on a plurality of alternative beam pairs to determine a most appropriate connection configuration.

According to examples of the present technique, the UE 130 receives from the communication network, for example via one of the gNodeBs 110, 120, measurement configuration data specifying beam measurements to perform at the UE and specifying beam selection criteria regarding which beam(s) should be selected for reporting back to the network. A selected beam or beam-pair may be considered a "best" (or preferred) beam or beam pair relative to other received beams or beam pairs. The criteria for selecting the best beam may depend on signals quality measurements specified by the network via the measurement configuration data, which may be stored at the UE 130.

A 3GPP LTE initial access procedure may involve discovery of the UE 130 by the gNodeBs 110, 120 and vice versa. However, for higher frequency communications such as mmW, it is desirable that the UE 130 and the NodeB 110, 120, besides detecting the presence of each other and any access request from the UE, also determine appropriate initial beamforming directions to establish communication. The LTE initial access procedure comprises each cell periodically transmitting on a downlink a PSS and an SSS twice in every radio frame. Both transmissions in a radio frame are identical for the PSS, but they are different for the SSS so the UE 130 can discriminate between the first and the second transmission. The UE may use the PSS and SSS to:

- achieve radio frame, subframe, slot and symbol synchronisation in the time domain
- identify a channel bandwidth centre in the frequency domain
- deduce a Physical Layer Cell Identity (PCI)

Detecting the PSS and SSS is performed in advance of measuring cell-specific reference signals and decoding a Master Information Block on a Physical Broadcast Channel (PBH). The PSS and SSS or one or more special-purpose counterpart synchronisation signals (xSS) for a high frequency network may also be used for mmW communications to determine a beamforming direction of the UE 130, based upon angles of arrival of signal paths from the gNodeB 110,120 or an eNodeB (not shown). Once the UE 130 has determined its beamforming direction from the synchronisation signal(s), the corresponding gNodeB or eNodeB may determine its beamforming direction by scanning for and detecting the presence of a Random Access (RA) preamble directionally transmitted by the UE 130. A dedicated synchronisation signal similar to the PSS and/or SSS may be used to determine initial beamforming directions.

It may be assumed that beamforming directions are constant over the duration of an initial access procedure and thereafter instantaneous beamforming may be performed by transmission and detection of beam-specific reference signals and by performing channel estimation at the UE 130 and possibly also at the gNodeBs 110, 120. One example of a beam-specific reference signal is a channel status information reference signal (CSI-RS), previously used in LTE as a cell-specific value, but used in embodiments such that it has a beam-specific value to allow a receiver to distinguish between different beams originating from the same transmission reception points and to distinguish between beams from different transmission reception points within a communication range of the UE.

As shown in Figure 1, a beam pair comprising a Tx beam 112 from the first gNodeB 110 and a Rx beam 132 of the UE 130 form a selected pair based on a signal quality metric. Similarly, a Tx beam 122 from the second gNodeB 120 and an Rx beam 134 of the UE 130 form a selected pair based on a signal quality metric In this example on the best beam pair is selected for each UE and gNodeB combination, but in alternative examples all or a subset of the Nrx*Ntx beam parings with each gNodeB may be ranked in a selection order based upon a signal quality metric. Alternatively, all 2 Nrx*Ntx beam pair combinations or a subset of those beam pair combinations considering the different pairings between each of the UE Nrx beams with respective ones of the Ntx beams of the first gNodeB 110 and the Ntx beams of the second gNodeB 120 are considered in aggregate to perform relative rankings of beam pairs and to select one or more beam pairs as potential handover connections in the event of an existing connection experiencing a drop in signal quality.

Figure 2 schematically illustrates a scenario where a UE is within range of only a single mmW TRP 210. As show in Figure 2, the TRP is capable of transmitting a total of three different beams comprising "Beam 2-1" 212, "Beam 2-2" 214 and "Beam 2-3" 216. A first CSI-RS may be transmitted in Beam 2-1 212 by the mmW TRP 210; a second CSI-RS may be transmitted in Beam 2-2 214 by the mmW TRP 210; and a third CSI-RS may be transmitted in Beam 2-3 216 by the mmW TRP 210. The first, second and third CS-RS are different with respect to each other, thus allowing channel estimation circuitry in the receiving UE 100 to distinguish between the three different beams.

The mmW TRP cell identity may be determined via the initial access procedure using the synchronisation signals as described above, which allows a mapping to be made between the different beams 212, 214, 216 and the particular mmW TRP 210. The UE 110 is also capable of beamforming in a plurality of different directions and three alternative UE beams comprising "Beam 1-1" 112, "Beam 1-2" 114 and "Beam 1-3" 116 may be utilised to form a connection with the mmW TRP 210. The UE may determine signal quality by detecting a received signal, determining the received signal quality and identifying which of the three transmitted beams the received signal corresponds to via the beam-specific CSI-RS. The nine different alternative beam pair combinations may be ranked according to a signal metric, such as, in order of decreasing signal strength. However, other metric may be used such as signal strength relative to a "benchmarking signal" corresponding to a current connection or a historical connection in the same cell or a similar cell. For example all signals greater than or equal to a current or previous macro-cell connection signal strength may be selected and identified as candidate handover target connections. The signal quality matric may be based on one or more of: a reference signal received power (RSRP); a reference signal received quality (RSRQ); a received signal strength indicator (RSSI); a signal strength threshold such as a minimum signal to noise ration threshold; a relative signal strength threshold; a combined threshold for a given transmit-receive beam pair; or a difference from a predetermined benchmarking signal.
Considering Figure 2, when the UE performs measurement, the best beam pair from the UE is beam 1-2 with TRP beam 2-2. In this case, since the cell is within one TRP, the UE can report the best beam for this cell.

Embodiment 1: the UE reports the N best beams for the cell when there is only one TRP in the cell. However, in alternative embodiments similar to Embodiment 1 there are more than one TRPs in the cell but TRP are transparent to the UE and the UE simply receives a beam source. N may be configured by the network.

An example of an information element (IE) corresponding to measurement configuration data using the legacy Abstract Syntax notation (ASN) code can look like this:

```
MeasResultEUTRA-NR ::= SEQUENCE {
    physCellId                  PhysCellId, cgi-Info                    SEQUENCE {
        cellGlobalId                CellGlobalIdEUTRA,
        trackingAreaCode            TrackingAreaCode,
        plmn-IdentityList           PLMN-IdentityList2           OPTIONAL
```

```
    }                              OPTIONAL,
    measResultList ::=    SEQUENCE (SIZE (1..maxBeamReport)) OF MeasResult
    beamIDList    ::=     SEQUENCE (SIZE (1..maxBeamReport)) OF (1..beamIDMax)
}

MeasResult :: SEQUENCE {
    rsrpResult                     RSRP-Range
    OPTIONAL,
    rsrqResult                     RSRQ-Range
    OPTIONAL,
    ...,
```

The physical cell ID is a non-unique value (e.g. in the range 0 – 503 in LTE, it may be more in NR) used to distinguish transmissions from nearby cells. The cell ID is a unique value found in SIB1 in LTE, used to identify the cell within the network.

The UE determines the physical cell ID during initial synchronisation to the cell. The lower protocol layers pass the information to the upper layers to be included in the Radio Resource Controller (RRC) Connection Reestablishment Request message. The Cell Global Identity is the concatenation of the LAI (Location Area Identity) and the CI (Cell Identity) and uniquely identifies a given cell in the network.

Embodiment 2: the UE reports the best N beams pair, where N is a non-zero integer and may be configured by the network. For example, in this case, the UE can report (beam1-1,beam2-1), (beam1-2,beam2-2),(beam1-3,beam2-3).

An example of an IE (measurement configuration data) using the legacy ASN code can look like this:

```
MeasResultEUTRA-NR ::= SEQUENCE {
    physCellId                  PhysCellId, cgi-Info                    SEQUENCE {
        cellGlobalId                CellGlobalIdEUTRA,
        trackingAreaCode            TrackingAreaCode,
        plmn-IdentityList           PLMN-IdentityList2         OPTIONAL
    }
                                OPTIONAL,
    measResultList ::=    SEQUENCE (SIZE (1..maxBeamReport)) OF MeasResult
    NWbeamIDList    ::=          SEQUENCE (SIZE (1..maxBeamReport)) OF
(1..beamIDMax)
    UEbeamIDList    ::=          SEQUENCE (SIZE (1..maxBeamReport)) OF
(1..beamIDMax)

}
```

```
MeasResult ::= SEQUENCE {
    rsrpResult              RSRP-Range
    OPTIONAL,
    rsrqResult              RSRQ-Range
    OPTIONAL,
    ...,
}
```

Scenario 2: A cell contains multiple TRPs (see, for example Figure 3).

Figure 3 schematically illustrates a wireless communications network in which a given cell corresponding to a coverage area of an eNodeB or a gNodeB comprises multiple high frequency (short range) TRPs. As shown in Figure 3, a first NodeB 310 has a corresponding first macro-cell 350 representing an omnidirectional coverage area, for example at a frequency of 6GHz or below. Within the first macro-cell 350 a total of twelve high frequency TRPs 360 are located. The high frequency TRPs 360 may be, for example, UEs or high-frequency small cells. Each TRP 360 is capable of initiating a connection with the NodeB 310 and different pairs of the multiple TRPs can also form Tx-Rx connections with each other. Thus the Figure 3 example arrangement provides multi-connectivity by allow handovers between higher frequency 5G mmW cells (the TRPs) and lower frequency 4G macro-cells 350, 372, 374, 376 communicating at below 6GHz, which offer more robust connections but offer comparatively lower bandwidth. Due to obstructions and UE mobility, frequent handovers between TRPs and between different mmW links with a given TRP are likely. Thus an ability to efficiently and accurately identify suitable target handover connections may improve network efficiency in such a heterogeneous network. The measurements of N best beams according to some examples are performed by a UE for both serving cell and neighbouring cell. In other embodiment, the number of serving beam and neigbouring beam may be different. If measurement event is triggered, then the UE may send a measurement report to the serving cell. So measurement of the cells (beams within the cell) may cover both the serving and any neighbour cell(s). The result of the UE determining the N best beams (or M best beams, N may not be the same as M) may be included in the measurement report.

The viability of establishing connections between individual TRPs (or beam sources) may depend upon discovery of other TRPs within communication range of the UE at a chosen frequency and parameters of the beams such as beam direction, beam frequency and beam gain. In some examples the UE is aware of the TRPs (e.g. has identified them a via discovery process). In alternative examples the UE is unaware of the TRPs such that TRPs remain undiscovered although beams originating from them may still be detected by the UE. Since the cell 350 of the gNodeB 310 has a wider coverage area than individual TRPs 360, not all TRPs in the cell 350 are likely to be simultaneously visible to a given TRP 362, 364 at a particular instant in time. Some of the TRPs 360 may be static (e.g. small cells) whilst others may be mobile (e.g. a TRP corresponding to a UE). As shown in Figure 3, a first TRP 362 capable of performing multi-beam transmission and reception is capable of establishing a connection with a second TRP 364 due to the close proximity to the two TRPs 362, 364. In the Figure 3 example, cell identifiers for the gNodeB's may be determined by UEs via PSS/SSS type synchronisation signals. Similarly individual TRPs 360 may be identifiable by a UE via transmission of synchronisation signals from the respective TRP. Thus each TRP 360 may be associated with its own small cell having a small cell identifier or TRP identifier.

In this example, a total of nine different Tx-Rx beam pairings between the TRPs 362, 364 may be used. Signal quality measurements may be made on some or all of the nine possible beam pair combinations to select a subset of one of more beam pairs or to rank at least a subset of the beam pairs in a relative order or in groupings depending upon a signal quality metric. In this arrangement, the measurement configuration data used to configure the UE to perform beam measurement may specify a format for the measurement results to be returned to the network, and one or more identifiers for each beam. The beam identifier may include an identifier for the encompassing cell 350 and an individual TRP identifier as well as a value to discriminate between different beams corresponding to the given TRP. Alternatively, a global beam identifier may be provided which implicitly identifies an associated TRP.

The first TRP 362 of Figure 3, may be capable of forming a paired beam or a single beam connection with any one of at least three closest TRPs 364, 366, 368. A TRP pair such as TRPs 362, 364 could between them perform beam measurements and select an appropriate beam pair for an initial connection or a handover based upon signal quality measurements made by a receiving TRP of the pair. However, a more appropriate connection or handover decision may be performed if a given UE (not shown) within coverage of the cell 350 should measure all detectable received signals and associated signal qualities. The gNodeB 310 sends beam measurement configuration data to the UE (which may correspond to a TRP) and the UE, having measured parameters associated with multiple received beams such as signal quality parameters, reports back to the network via the gNodeB 310 beam measurement results depending upon the beam measurement configuration data. The beam measurement configuration data may also specify which signal quality measurements to perform prior to the beam selection or beam pair selection. The beam measurement results may identify one or more beams associated with each TRP detected by the UE, the number of beams being specified by the beam measurement configuration data. Alternatively, one or more beams may be selected based upon signal quality across all of the detected transmission reception points TRPs. Upon receipt of the beam measurement results, the gNodeB 310 may select a handover target TRP using those results, but possibly also taking account of other factors such as current relative loadings of the candidate TRPs or statistics of previous connections of the given UE to a given candidate handover TRP.

Figure 3 shows a second gNodeB 370, which is itself capable of beamforming to direct transmissions in three different sectors 372, 374, 376 spanning a 360° angular range surrounding it. In this case each of the three sectors can be considered as a distinct cell from the perspective of TRPs reporting back beam measurement results to the gNodeB 370. A first cell 372 has a total of seven different TRPs 382, 384, 386, 388, 390, 392, 394 within its range and each of those TRPs is capable of multi-beam transmission. The UE is not shown in the Figure 3 example, but the UE may receive beams from any one of the TRPs within communication range of the TRP. A UE in the Figure 3 arrangement may perform measurement of best beams and evaluate those best beams against a cell, which may characterize the cell. The measured beams may originate from a serving cell or from neighbouring cells, but the selected beams are mapped to a given cell according to the present technique. These seven TRPs of Figure 3 use a communication link associated with the first cell 372 to send beam measurement results to the network via the gNodeB 370. For a TRP such as TRP 394, which is close to the boundary between two cells 372, 372, the gNodeB may collate different beam measurement report data from a UE on a boundary between the cells relating to selected signals involving transmitted beams from TRPs in the two different cells 372, 372. For example beam pair between TRP 394 and a TRP 396 in the adjacent cell may be evaluated and reported back to the gNodeB 370.

Figure 3 described above shows two examples of what cells of a heterogeneous network may look like. But in general, one cell may contains multiple TRPs. In this case, when the UE performs measurement, it may have multiple possible target cells. It will be a good idea for the UE to report multiple TRP beam pairs or N best beams to the network in order for the network to choose which TRP should the UE handover to based on load, signal and other condition.

Embodiment 3: the UE reports the best beam of each TRP in the cell when there are multiple TRPs in the cell.

For example, the UE may report $TRP_1$ best beam, $TRP_2$ best beam......$TRP_n$ best beam if there are N TRP in the best.

An example of IE (measurement configuration data) using the legacy ASN code can look like this:

```
MeasResultEUTRA-NR ::= SEQUENCE {
    physCellId                    PhysCellId, cgi-Info                      SEQUENCE {
        cellGlobalId                  CellGlobalIdEUTRA,
        trackingAreaCode              TrackingAreaCode,
        plmn-IdentityList             PLMN-IdentityList2          OPTIONAL
    }
                                                                  OPTIONAL,
    measResultList ::=    SEQUENCE (SIZE (1..maxTRPReport)) OF MeasResult
    beamIDList     ::=    SEQUENCE (SIZE (1..maxTRPReport)) OF (1..beamIDMax)
    beamIDList     ::=    SEQUENCE (SIZE (1..maxTRPReport)) OF (1..TRP_IDMax)

}

MeasResult :: SEQUENCE {
    rsrpResult                    RSRP-Range
    OPTIONAL,
    rsrqResult                    RSRQ-Range
    OPTIONAL,
    ...,
}
```

Alternatively, ID information can be within each MeasResult

```
MeasResultEUTRA-NR ::= SEQUENCE {
    physCellId                    PhysCellId, cgi-Info                      SEQUENCE {
        cellGlobalId                  CellGlobalIdEUTRA,
        trackingAreaCode              TrackingAreaCode,
        plmn-IdentityList             PLMN-IdentityList2          OPTIONAL
    }
                                                                  OPTIONAL,
    measResultList ::=    SEQUENCE (SIZE (1..maxTRPReport)) OF MeasResult
}

MeasResult :: SEQUENCE {
    trpID                 INTERGER(1..TRP_IDMAX)
    beamID                INTERGER(1..beamIDMAX)
    rsrpResult                    RSRP-Range
    OPTIONAL,
    rsrqResult                    RSRQ-Range
    OPTIONAL,
    ...,
}
```

Embodiment 4: the UE reports the top K best beam among all TRPs in the cell when there are one or multiple TRPs in the cell. K, which is a non-zero integer, can be network configured or pre-defined in the specification.

For example, assume is 3. Then the UE report the top three best TRP. For each TRP report, the UE report the best beam. An example measurement report can look like ($TRP_1$ - beam3, $TRP_5$ - beam 2, $TRP_8$ - beam 10).

An example of IE (measurement configuration data) using the legacy ASN code can look like this:

```
MeasResultEUTRA-NR ::= SEQUENCE {
    physCellId                  PhysCellId, cgi-Info                    SEQUENCE {
        cellGlobalId                CellGlobalIdEUTRA,
        trackingAreaCode            TrackingAreaCode,
        plmn-IdentityList           PLMN-IdentityList2          OPTIONAL
    }
                                                                OPTIONAL,
    measResultList ::=          SEQUENCE (SIZE (1..maxBeamReport)) OF MeasResult
}

MeasResult :: SEQUENCE {
    trpID                       INTERGER(1..TRP_IDMAX)
    beamID                      INTERGER(1..beamIDMAX)
    rsrpResult                  RSRP-Range
OPTIONAL,
    rsrqResult                  RSRQ-Range
OPTIONAL,
    ...,
}
```

Embodiment 5: for completeness, we also want to cover the UE report only 1 best beam among all TRP in the cell. Everything can be taken care of in the physical layer. In this case, the UE performs the measurement and select the beam measurement across all TRP within the cell and report that.

An example of IE (measurement configuration data) using the legacy ASN code can look like this:

```
MeasResultEUTRA-NR ::= SEQUENCE {
    physCellId                  PhysCellId, cgi-Info                    SEQUENCE {
        cellGlobalId                CellGlobalIdEUTRA,
        trackingAreaCode            TrackingAreaCode,
        plmn-IdentityList           PLMN-IdentityList2          OPTIONAL
    }
```

```
    OPTIONAL,
      trpID                    INTERGER(1..TRP_IDMAX)
      beamID                   INTERGER(1..beamIDMAX)
        rsrpResult                   RSRP-Range
    OPTIONAL,
        rsrqResult                   RSRQ-Range
    OPTIONAL
}
```

Embodiment 6: It is also possible that the network may configure the UE to report a non-zero integer number, R, best beams for each TRP and report K TRP.

Embodiment 7: eNodeB or gNodeB can configure a TRP-specific RSRP threshold and send it to the UE. Then the UE can report the beams which are higher than the TRP-specific RSRP threshold.

Embodiment 7a: eNodeB or gNodeB can configure a threshold and send it to the UE. Then the UE can report the beams which are higher than the "global" or "absolute" threshold. The absolute threshold may be an RSRP threshold or otherwise. The threshold may also be the relative offset of the best beam within the cell.

Embodiment 8: Compared to embodiment 6, in this embodiment, the number of reported beams, R can be changed depending on the channel conditions. The eNodeB or gNodeb can configure a TRP-specific delta value to the UE. If the beams measured RSRP value are TRP-specific delta higher than the active beam (e.g. the current communicating beam), then the UE reports them. For example, the current active beam, beam1 has a RSRP of -100dBm, and a TRP-specific delta of 10dB is signaled. If only beam2 and beam5 has 10dB higher than beam1 among all the RSRP measurements, the UE reports RSRPs of beam2 and beam5. This provided adaptability to changes in network conditions allowing for more efficient identification of handover candidates, with more candidates being identified in the measurement report when handovers are likely to be required more frequently.

In general, the ASN code of the example measurement configuration data described herein are just one example of showing what it may look like. It may change based on what ID (identifier) may be introduced for beam, cell and TRP. If a unique beam ID is introduced, then TRP ID may not be needed. Beam ID can also be identified by location of the signal based on time and frequency domain or resources signed by the network instead of a beam ID as a number.

Figure 4 schematically illustrates an apparatus arrangement for performing a communication between a beam source 400 and a UE 450 according to some examples. This example uses hybrid digital and analogue Tx and Rx beamforming. The multi-beam TRP 400 comprises baseband precoding circuitry 410 including a Multiple Input Multiple Output (MIMO) encoder and a baseband precoder for performing digital beamforming. MIMO is an antenna technology for wireless communications in which multiple antennas are used at both the source (transmitter) and the destination (receiver). The antennas at each end of the communications circuit are combined to reduce errors and to improve data speed. The baseband precoding circuitry 410 is connected to an RF beamformer 420, which performs analogue beamforming via a plurality of RF chains 430a to 430n. Each RF chain may comprise parallel-to-serial converters and digital-to-analogue converters (DAC). A controller 440 may control the baseband precoding circuitry and the RF beamformer to form beams using an antenna array, for example using a matrix of beamforming coefficients.

The UE 450 may also be capable of Rx beamforming using a plurality of Rx beam patterns in a plurality of different directions via respective large antenna arrays. These correspond to multiple MIMO channels. Thus a plurality of Tx-Rx beam pairs may be formed between the multi-beam TRP 400 and the UE 450. The UE 450 comprises an analogue RF beamformer 460 and baseband combining circuitry 470 (digital) comprising a baseband combiner and MIMO decoder (not shown). The analogue RF beamformer 460 is connected to the baseband combining circuitry 470 via a plurality of RF chains 480a to 480n each including analogue-to-digital converters and serial-to-parallel converters. The analogue beamformers 420, 460 each comprise frequency converters, phase shifters and antenna arrays 425a to 425n.

The RF beamformer 460 in the UE 450 has signal quality measurement circuitry 462 to measure signal qualities of Tx-Rx beam pairs. The signal qualities that are measured may depend upon stored beam measurement configuration data 492 stored in memory of a controller 490. The beam measurement configuration data 492 may be supplied to the UE 450 by the network, for example, from a serving gNodeB. The beam measurement configuration data 492 may specify a sequence of beam measurements to perform for beams received from the multi-beam TRP 400 and, or alternatively, from any other TRP within range of the UE. The beam measurement configuration data 492 may also specify beam selection criteria or Tx-Rx beam selection criteria for reporting back to the network via a beam measurement report. A set of beam measurement feedback circuitry 494 may send a beam measurement report, which may be formatted as specified by the beam measurement configuration data 492, to the network via a communication link with a serving gNodeB (not shown).

The beam measurement report may comprise beam measurement results specifying a non-zero integer N of selected beams depending upon the signal quality measurements. For example a single selected beam or beam-pair of a plurality of possible received beams or beam-pair combinations may be reported back to the network. Alternatively a fixed number of two or more beams or beam pairs may be reported back. The beam measurement feedback circuitry may in some examples report back a variable number of selected beams or beam pairs when the signal quality measurement specify that any beams or beam-pairs having above a minimum threshold value or below a maximum threshold value should be selected. A predetermined threshold may be specified by the network via the beam measurement configuration data. Different TRPs may be assigned different predetermined threshold values. Similarly, the number of beams or beam pairs selected for reporting back to the network in the measurement report may be variable where a benchmarking signal strength is used to determine the signal quality. For example any signals at least as strong as a current network connection (mmW, cmW or lower frequency such as a 4G frequency) may be selected for reporting back to the network as a potential handover candidate.

Selection of a beam or beam pair for reporting may depend on the signal being at least a predetermined magnitude ("delta value") greater than a benchmarking signal strength. The delta value(s) may be set by the network and specified in the beam measurement configuration data. Where more than one signal is selected for reporting, the selected signals may be assigned a ranking in order of selection preference and the ranking may be in bands such that more than one selected signal has the same ranking. The selection and ranking may be performed on aggregate for all signals of two TRPs or groups of more than two TRPs to assist the network with selection of handover candidates. Although signal selection is performed at the UE 450, the ranking may alternatively be performed at least in part by the network, such as a gNodeB or an eNodeB, based upon signal quality measurements fed back by the UE in the beam measurement results.

Figure 5 is a flowchart schematically illustrating a method for performing beam measurement for use in a UE of a wireless telecommunications network. The method begins at process element 510 where the UE obtains beam measurement configuration data from the network. This beam measurement configuration data may be in the form of an Abstract Syntax Notation message specifying, for example, physical cell ID, a global cell ID and a sequence of recommended measurement results to be returned by the UE to the network. The measurement configuration data may also specify beam location information, beam offset and beam periodicity. The beam measurement configuration data may also specify one or more signal quality metrics to be used to select one or more beams or beam pairs based upon measurements made at the UE. For example the beam measurement configuration data may include a request to provide an RSRP result and an RSRQ result or to return only beams or beam pairs with results in a predetermined specified value range for a particular beam parameter. The beam measurement configuration data may be transmitted to the UE via network signalling or may be actively retrieved by the UE, for example, in response to a measurement request from the network.

Next, at process element 520 the UE receives measurement request from the network and to perfrom a measurement event and in response to that measurement request, performs signal measurements that may be based upon measurements specified in the beam measurement configuration data. The UE sends measurement reports to the network when measurement event is triggered. The measurement report may or may not include a selected number of best beams determined during the measurement event. In some examples a predetermined set of signal strength measurements may be performed and the beam measurement configuration data may provide only criteria for selecting a subset of measured beams to be returned in the beam measurement results sent to the network. A signal quality metric may be measured for each of a plurality of beam pairs for a given TRP or beam source and, where more than one TRP or beam source is in communication range of the UE, a signal quality metric may be assessed on more than one TRP (beam source) and the results included in a single beam measurement report. Any kind of signal quality metric may be measured such as an RSRP value, an RSRQ value, and RSSI value, a signal-to-noise ratio, a signal strength of a given signal relative to a benchmarking signal etc. once the beam measurements have been performed and signal qualities have been established, one or more beams or beam pairs are selected for reporting back to the network at process element 530 based upon selection of at least one preferred beam (best beam) per TRP or beam source or based upon selection of at least one preferred beam across a group of two or more TRPs the selection depending upon the information requested by the measurement configuration data. The beam measurement configuration data may be obtained by the UE periodically or intermittently and may be updated as required by the network.

Figure 6 is a flowchart schematically illustrating a method for performing beam measurement configuration for use in a NodeB, such as a gNodeB of a wireless telecommunications network. The process begins at process element 610 where a beam measurement configuration data message is prepared for sending to a UE of the network. Next at process element 620 the beam measurements configuration data is transmitted as a message to the UE. Next at process element 630 the network transmits, for example, via a gNodeB, a measurement request to the UE to perform signal strength measurements. The UE performs measurement of received beams to select a non-zero integer number of received beams in response to a measurement trigger. The number of selected beams is configured is the UE by the network. In response to a request for signal strength measurements from the network, at process element 640 the NodeB receives measurement results data from the UE, the results data may be formatted and may have contents depending upon the information requested in the measurement configuration data message. For example, the beam measurement configuration data message may have specified that a single beam be selected as a preferred beam in relation to each TRP or beam source, in which case this data is returned by the UE and received the NodeB at process element 640. Upon receipt of this information, the NodeB proceeds to select a handover target, in terms of a target TRP or beam source and a target beam-pair based at least in part upon the received beam selection data received at process element 640. However the NodeB may also take into account additional information available to the network such as current relative loading of a number of alternative target TRPs (beam sources).

Thus the measurement results data from the UE may be used to perform a more efficient and accurate estimate of a suitable handover connection in the event of a sudden drop in signal quality of the current wireless connection. The ability to select not just a single handover candidate but to relatively rank a plurality of different candidate beam pairs and to specify which signal quality measurements or relatives signal strength measurements should be used by the UE in making a selection provides more flexibility to the network to identify as many viable beam connections (beam pairs or single beams) as may be required to maintain reliable communication with the given UE. The number of selected beam pairs specified by the beam measurement configuration data could be adjusted by the network so that it is increased where the interference conditions or UE position tracking data suggest that handovers are likely to be more frequent. In previously known systems signal strength measurements were performed on a per-cell basis rather than on a per-beam basis or for particular beam-pairings.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. Figure 7 illustrates, for one embodiment, example components of an electronic device 700. In embodiments, the electronic device 700 may be, implement, be incorporated into, or otherwise be a part of a user equipment (UE), a base station such as an evolved NodeB (eNB), gNodeB (sometimes denoted NR NodeB in 5G LTE communication systems) or some other electronic device. In some embodiments, the electronic device 700 may include application circuitry 702, baseband circuitry 704, Radio Frequency (RF) circuitry 706, front-end module (FEM) circuitry 708 and one or more antennas 710, coupled together at least as shown. When implemented as a base station, at least one of the application circuitry 702, baseband circuitry 704, Radio Frequency (RF) circuitry 706, front-end module (FEM) circuitry 708 may comprise beam measurement configuration circuitry to implement at the method of the flow chart of Figure 6, whereby the UE is configured to measure N best beams associated with an active cell of the UE such as an NR cell.

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband processing circuity 704 may interface with the application circuitry 702 for generation and processing of the baseband signals and for controlling operations of the RF circuitry 706. For example, in some embodiments, the baseband circuitry 704 may include a second generation (2G) baseband processor 704a, third generation (3G) baseband processor 704b, fourth generation (4G) baseband processor 704c, and/or other baseband processor(s) 704d for other existing generations, generations in development or to be developed in the future (e.g., fifth generation (5G), 6G, etc.). The baseband circuitry 704 (e.g., one or more of baseband processors 704a-d) may handle various radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, and/or constellation mapping/demapping functionality. In some embodiments, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 704e of the baseband circuitry 704 may be configured to run elements of the protocol stack for signaling of the PHY, MAC, RLC, PDCP and/or RRC layers. In some embodiments, the baseband circuitry may include one or more audio digital signal processor(s) (DSP) 704f. The audio DSP(s) 704f may be include elements for compression/decompression and echo cancellation and may include other suitable processing elements in other embodiments.

The baseband circuitry 704 may further include memory/storage 704g. The memory/storage 704g may be used to load and store data and/or instructions for operations performed by the processors of the baseband circuitry 704. Memory/storage for one embodiment may include any combination of suitable volatile memory and/or non-volatile memory. The memory/storage 704g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 704g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 706 may include a receive signal path which may include circuitry to down-convert RF signals received from the FEM circuitry 108 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the RF circuitry 706 may include a receive signal path and a transmit signal path. The receive signal path of the RF circuitry 706 may include mixer circuitry 706a, amplifier circuitry 706b and filter circuitry 706c. The transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the embodiments is not limited in this respect.

In some embodiments, the mixer circuitry 706a of the receive signal path and the mixer circuitry 706a of the transmit signal path may include two or more mixers and may be arranged for quadrature downconversion and/or upconversion respectively. In some embodiments, the mixer circuitry 106a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and/or direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710.

In some embodiments, the FEM circuitry 708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710.

In some embodiments, the electronic device 700 may include additional elements such as, for example, memory/storage, display, camera, sensor, and/or input/output (I/O) interface. In some embodiments, the electronic device of Figure 7 may be configured to perform one or more processes, techniques, and/or methods as described herein, or portions thereof.

Where functional units have been described as circuitry or controller, the circuitry or controller may be general purpose processor circuitry configured by program code to perform specified processing functions. The circuitry may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function.

Circuitry or controllers may be implemented, for example, as a hardware circuit comprising custom Very Large Scale Integrated, VLSI, circuits or gate arrays, off-the-shelf semiconductors such as logic chips, transistors, or other discrete components. Circuitry or controllers may also be implemented in programmable hardware devices such as field programmable gate arrays, FPGA, programmable array logic, programmable logic devices, A System on Chip, SoC, or the like. Different circuitry specified to perform different functions may be implemented independently in distinct hardware components or sub-components. Alternatively, different functions may be performed by the same processing hardware to combine two or more of the different functions in a single circuitry implementation. The circuitry may be general purpose processing circuitry configured by software to perform the associated function or may be special-purpose processing circuitry.

Machine readable program instructions may be provided on a transitory medium such as a transmission medium or on a non-transitory medium such as a storage medium. Such machine readable instructions (computer program code) may be implemented in a high level procedural or object oriented programming language. However, the program(s) may be implemented in assembly or machine language, if desired. In any case, the language may be a compiled or interpreted language, and combined with hardware implementations. The program instructions may be provided on a transitory or non-transitory storage medium.

EXAMPLES

Example 1 may include a method of network configures the signaling for measurement configuration to the user equipment (UE).

Example 2 may include the method of example 1 and/or some other example herein, where in the network configures the UE to report N best beams for the cell where only one TRP in cell or alternatively where there are more than one TRPs in the cell.

Example 3 may include the method of example 1 and/or some other example herein, where in the network configures the UE to report the best N beams pair. For example, in this case, the UE can report (beam1-1,beam2-1), (beam1-2,beam2-2),(beam1-3,beam2-3).

Example 4 may include the method of example 1 and/or some other example herein, where in the network configures the UE to report the best beam of each TRP in the cell when there are multiple TRPs in the cell.

Example 5 may include the method of example 1 and/or some other example herein, where in the network configures the UE to report top K best beam among all TRPs in the cell when there are multiple TRPs in the cell. K can be network configured or pre-defined in the specification.

Example 6 may include the method of example 1 and/or some other example herein, where in the network configures the UE to report only 1 best beam among all TRP in the cell. Everything can be taken care of in the physical layer. In this case, the UE performs the measurement and select the beam measurement across all TRP within the cell and report that.

Example 7 may include the method of example 1 and/or some other example herein, where in the network configures the UE to report R best beams for each TRP and report K TRP.

Example 8 may include the method of example 1 and/or some other example herein, where in the network can configure a threshold and send it to the UE. Then the UE can report the beams which are higher than the threshold.

Example 9 may include the method of example 1 and/or some other example herein, where in the network can configure a TRP-specific delta value to the UE. If the beams measured RSRP value are TRP-specific delta higher than the active beam (the current communicating beam with serving eNB), then the UE reports them. For example, the current active beam, beam1 has a RSRP of -100dBm, and a TRP-specific delta of 10dB is signaled. If only beam2 and beam5 has 10dB higher than beam1 among all the RSRP measurements, the UE reports RSRPs of beam2 and beam5 of the TRP.

Example 10 may include an apparatus comprising means to perform one or more elements of a method described in or related to any of examples 1-9, or any other method or process described herein.

Example 11 may include one or more non-transitory computer-readable media comprising instructions to cause an electronic device, upon execution of the instructions by one or more processors of the electronic device, to perform one or more elements of a method described in or related to any of examples 1-9, or any other method or process described herein.

Example 12 may include an apparatus comprising logic, modules, and/or circuitry to perform one or more elements of a method described in or related to any of examples 1-9, or any other method or process described herein.

Example 13 may include a method, technique, or process as described in or related to any of examples 1-9, or portions or parts thereof.

Example 14 may include an apparatus comprising: one or more processors and one or more computer readable media comprising instructions that, when executed by the one or more processors, cause the one or more processors to perform the method, techniques, or process as described in or related to any of examples 1-9, or portions thereof.

Example 15 may include a method of communicating in a wireless network as shown and described herein.

Example 16 may include a system for providing wireless communication as shown and described herein.

Example 17 may include a device for providing wireless communication as shown and described herein.

Example 18 may include beam measurement circuitry for use in a user equipment (UE) of a wireless telecommunications network having at least one NodeB, the beam measurement reporting circuitry to receive at the UE, from the network, beam measurement configuration data requesting a selection of a non-zero integer number, N, beams by the UE; and measure, in response to a measurement request from the network, signal qualities for a plurality of received beams originating from a beam source of the network, to select N beams to evaluate a serving cell and one or more neighbouring cells of the UE, the selection of the N beams depending upon the signal quality measurements.

Example 19 may include the beam measurement circuitry of example 18, wherein the beam measurement circuitry is further to report in a measurement report to the active cell of the UE, the beam measurement results specifying the N selected beams.

Example 20 may include the beam measurement circuitry of example 18 or 19, wherein the beam source is one of a New Radio NodeB, an evolved NodeB or a transmission reception point, TRP.

Example 21 may include the beam measurement circuitry of any of examples 18 to 20, wherein the type of signal measurements performed in response to the measurement request depend upon the beam measurement configuration data.

Example 22 may include the beam measurement circuitry of example 19 and/or some other example herein, wherein the beam measurement results associated with a given selected beam comprise at least one of: a unique beam identifier to uniquely identify a received beam amongst beams of all beam sources in communication range of the UE; or a combination of an identifier of the beam source and a non-unique beam identifier for a beam of the identified beam source.

Example 23 may include the beam measurement circuitry of any of examples 18 to 22, wherein the beam measurement configuration data relate to beams corresponding to different ones of a plurality of beam sources located within communication range of the UE.

Example 24 may include the beam measurement circuitry of example 23 and/or some other example herein, wherein the beam measurement configuration data specifies that the beam measurement results comprise a non-zero integer K of selected beams, the beam selection being performed collectively for all received beams corresponding to two or more of the plurality of beam sources.

Example 25 may include the beam measurement circuitry of example 23 and/or some other example herein, wherein the beam measurement configuration data specifies selection, for reporting to the network, of only one beam from amongst the plurality of beam sources or specifies selection of only one transmit-receive beam pair between the UE and a corresponding beam source.

Example 26 may include the beam measurement circuitry of any of examples 18 to 25, wherein the UE supports receiver beamforming and wherein the beam measurement configuration data specifies measurement of signal quality for each of a plurality of transmit-receive beam pairs corresponding to a respective beam source and the UE and wherein the beam measurement results specify at least one transmit-receive beam pair selected based upon the signal quality measurements.

Example 27 may include the beam measurement circuitry of any of examples 18 to 26, wherein the signal quality measure upon which selection of at least one beam from the plurality of received beams is based comprises the measured signal quality being above a predetermined threshold value.

Example 28 may include the beam measurement circuitry of example 27 and/or some other example herein, wherein the beam measurement configuration data specifies the predetermined threshold value.

Example 29 may include the beam measurement circuitry of example 28 and/or some other example herein, wherein the beam measurement configuration data specifies a first predetermined threshold value for a first beam source and a second, different, predetermined threshold value for a second beam source.

Example 30 may include the beam measurement circuitry of example 18 or 22 and/or some other example herein, wherein selection of the at least one beam from the plurality of received beams of the respective beam source is performed based on a selected beam having a signal quality greater than a measured signal quality of an active beam.

Example 31 may include the beam measurement circuitry of example 29 and/or some other example herein, wherein the beam selection is based on the selected beam having a signal quality greater by at least a predetermined difference in magnitude relative to an active beam, the predetermined difference in magnitude being specified in the beam measurement configuration data.

Example 32 may include the beam measurement circuitry of example 31 and/or some other example herein, wherein the predetermined difference in magnitude for the beam selection is separately configurable by the network in the beam measurement configuration data for each beam source.

Example 33 may include the beam measurement circuitry of any of the preceding examples, wherein the signal quality measured in response to the measurement request comprises at least one of: a reference signal received power (RSRP); a reference signal received quality (RSRQ); a received signal strength indicator (RSSI); a signal strength threshold; a relative signal strength threshold; an absolute threshold; or a difference from a predetermined benchmarking signal.

Example 34 may include a UE comprising a display screen and beam measurement circuitry according to any one of examples 18 to 33.

Example 35 may include machine-readable instructions provided on at least one machine-readable medium, the machine-readable instructions, when executed by a User Equipment, UE, of a wireless telecommunications network having at least one NodeB, to cause processing hardware of the UE to obtain, from the network, beam measurement configuration data specifying a non-zero integer, N, beams to be selected based on selection criteria; measure, in response to a measurement request from the network, a quality metric of at least one received beam originating from a beam source of the network to provide for selection of N selected beams depending upon the beam quality metric, the selection to be performed at the UE based upon the measurement data.

Example 36 may include the machine readable instructions of example 35 and/or some other examples herein, to cause processing hardware of the UE to report from the UE to the network, beam measurement results wherein a content of the beam measurement results depends upon the beam measurement configuration data.

Example 37 may include the machine readable instructions of example 36 and/or some other examples herein, wherein the beam quality metric comprises at least one of a received signals strength indicator, a signal to noise ratio a relative signal strength value, an indication that the beam has a signal strength at least as strong as an active signal.

Example 38 may include circuitry for use in a NodeB of a wireless telecommunications network, the circuitry comprising processing circuitry to prepare a beam measurement configuration message specifying a sequence of beam measurements to be performed by a user equipment (UE) to select at least one preferred beam from a plurality of beams received by the UE, the measurement configuration data message specifying a non-zero integer number, N, of preferred beams to be determined for an active cell of the UE; and comprising transmission circuitry to transmit the beam measurement configuration message to the UE; the transmission circuitry to further transmit a measurement request to the UE to trigger the UE to perform measurements of beam parameters according to the beam measurement configuration data to identify the N preferred beams and to map the N preferred beams to the active cell.

Example 39 may include the circuitry for use in a NodeB of example 38 and/or some other example herein to receive from the UE in response to the measurement request, measurement results including the N preferred beams for the active cell; and identify as a handover target for the UE, at least one of the N preferred beams.

Example 40 may include the circuitry for use in a NodeB of example 39 and/or some other example herein, wherein the N beams comprise least one preferred beam for each of a plurality of beam sources, the preference depending upon a signal quality determined from the beam parameter measurements.

Example 41 may include the circuitry for use in NodeB of example 40 and/or some other example herein, wherein the N preferred beams are identified based upon a relative ranking of signal quality indicated by the beam parameter measurements, the ranking being performed depending upon a signal quality for an aggregated set of beams across the plurality of beam sources.

Example 42 may include a NodeB of a wireless telecommunications network comprising a transceiver and the circuitry for use in a NodeB of any one or more of examples 38 to 41.

Example 43 may include machine-readable instructions provided on at least one machine-readable medium, the machine-readable instructions, when executed by a NodeB of a wireless telecommunications network, to cause processing hardware of the NodeB to: prepare a beam measurement configuration message specifying a sequence of beam measurements to be performed by a user equipment (UE) to select at least one beam from a plurality of beams received at the UE from at least one beam source, the beam measurement configuration message specifying contents of measurement results to be made by the UE including a number of preferred beams to be selected; transmit the beam measurement configuration message to the UE; and transmit a measurement request to trigger the UE to perform beam measurements specified by the beam measurement configuration data message.

Example 44 may include the machine readable instructions of example 43 and/or some other example herein, wherein the beam measurement configuration message specifies that the sequence of beam measurements performed by the UE comprise measurements to identify at least one preferred beam pair corresponding to the at least one beam source, the at least one preferred beam pair comprising a combination of a receiver beam formed by the UE and a transmission beam formed by the at least one beam source.

Example 45 may include the machine readable instructions of example 43, wherein the beam measurement configuration message specifies beam measurements to select the beam(s) depending upon at least one of: a highest signal strength, a signal strength greater than or equal to a current connection, a signal quality threshold, at least a minimum difference between a measured signal strength and a comparative signal strength.

Example 46 may include means for performing beam measurement reporting, for use in a user equipment (UE) of a wireless telecommunications network having at least one NodeB, the means for performing beam measurement reporting comprising: means for receiving, from the network, beam measurement configuration data requesting a selection of a non-zero integer number, N, beams by the UE; and means for measuring, in response to a measurement request from the network, signal qualities for a plurality of received beams originating from a beam source of the network and to select the N beams as specified by the beam measurement configuration data, the selection depending upon the signal quality measurements.

Example 47 may include the means for performing beam measurement reporting of example 46, wherein the UE is capable of receive beamforming and wherein the means for measuring is to measure signal qualities of transmit-receive beam pairs.

Example 48 may include means for performing beam measurement configuration, for use in a NodeB of a wireless telecommunications network, the means for performing beam measurement configuration comprising: means for preparing a beam measurement configuration message specifying a sequence of beam measurements to be performed by a user equipment (UE) to select at least one preferred beam from a plurality of beams originating from at least one beam source within a communication range of the UE, the measurement configuration data message specifying a non-zero integer number, N, of preferred beams and specifying a mapping between the number of preferred beams and an active cell of the UE; means for transmitting the beam measurement configuration message to the UE; means for transmitting a measurement request to the UE to trigger the UE to perform measurements of beam parameters according to the beam measurement configuration data and to identify the N preferred beams.

Example 49 may include the means for performing beam measurement configuration of example 48, wherein the contents of the beam parameter measurements comprise a number of selected beams and an association between the selected beams and the at least one beam source.

Example 50 may include a method to be performed by a user equipment (UE) in wireless telecommunications network having at least one NodeB to perform beam measurement and reporting, the method comprising: obtaining, from the network, beam measurement configuration data specifying a non-zero integer, N, beams to be selected based on selection criteria; measuring, in response to a measurement request from the network, a quality metric of at least one received beam originating from a beam source of the network; and selecting N beams depending upon the beam quality metric.

Example 51 may include a method to be performed by a NodeB in wireless telecommunications network to configure beam measurement and reporting, the method comprising:
    prepare a beam measurement configuration message specifying a sequence of beam measurements to be performed by a user equipment (UE) to select at least one preferred beam from a plurality of received beams and to evaluate an active cell of the UE based upon the selected beam(s), the beam measurement configuration message specifying contents of measurement results to be made by the UE including a number of preferred beams;
    transmit the beam measurement configuration message to the UE;
    transmit a measurement request to the UE to perform beam measurements on received beams as specified by the beam measurement configuration data message.

Example 52 may include machine-readable instructions provided on at least one machine-readable medium, the machine-readable instructions, when executed by a UE of a wireless telecommunications network, to cause processing hardware of the UE to:

receive from the network, a beam measurement configuration message requesting a selection of a non-zero integer number, N, of best beams by the UE;

measure, in response to a measurement request from the network, parameters corresponding a plurality of received beams detectable at the UE; and
choose N best beams to characterize an active cell of the UE, the choice of the N beams depending upon the measured beam parameters.

Example 53 may include machine readable instructions as claimed in example 52, wherein the beam measurement configuration message specifies the parameters to choose the N best beam(s) depending upon at least one of: a highest signal strength, a signal strength greater than or equal to a current connection, a signal quality threshold, at least a minimum difference between a measured signal strength and a comparative signal strength relative to an active signal.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.